(12) United States Patent
Nazari et al.

(10) Patent No.: US 12,709,552 B2
(45) Date of Patent: Aug. 18, 2026

(54) METHODS FOR BATTERY-GRADE AQUEOUS SOLUTIONS OF NICKEL SALTS

(71) Applicant: Bluegrass Infrastructure Partners Holdings LLC, Toronto (CA)

(72) Inventors: Amir Mohammad Nazari, Westborough, MA (US); Eric Gratz, Stow, MA (US); Michael Christopher Pelsozy, Westborough, MA (US)

(73) Assignee: BLUEGRASS INFRASTRUCTURE PARTNERS HOLDINGS LLC

( * ) Notice: Subject to any disclaimer, the term of this patent is extended or adjusted under 35 U.S.C. 154(b) by 0 days.

(21) Appl. No.: 19/242,885

(22) Filed: Jun. 18, 2025

(65) Prior Publication Data

US 2026/0035263 A1 Feb. 5, 2026

Related U.S. Application Data

(60) Provisional application No. 63/754,453, filed on Feb. 5, 2025, provisional application No. 63/678,222, filed on Aug. 1, 2024.

(51) Int. Cl.

| | |
|---|---|
| ***C01G 53/50*** | (2025.01) |
| ***C22B 3/44*** | (2006.01) |
| ***C22B 7/00*** | (2006.01) |
| ***H01M 10/54*** | (2006.01) |

(52) U.S. Cl.
CPC ................ *C01G 53/50* (2013.01); *C22B 3/44* (2013.01); *C22B 7/007* (2013.01); *H01M 10/54* (2013.01); *C01P 2006/40* (2013.01)

(58) Field of Classification Search
CPC ........... C01G 53/50; C22B 3/44; C22B 7/007; H01M 10/54
See application file for complete search history.

(56) References Cited

U.S. PATENT DOCUMENTS

2001/0001650 A1* 5/2001 Duyvesteyn ............. C22B 3/42 423/139
2021/0079495 A1 3/2021 Harris et al.
(Continued)

FOREIGN PATENT DOCUMENTS

CN 114457245 * 5/2022
KR 102543371 B1 6/2023
(Continued)

OTHER PUBLICATIONS

English translation of WO Publication 2025-048109, Mar. 2025.*
(Continued)

*Primary Examiner* — Brittany L Raymond
(74) *Attorney, Agent, or Firm* — McCoy Russell LLP

(57) ABSTRACT

Methods are provided for preparing an aqueous nickel salt solution from an aqueous mixed metal salt solution comprising cobalt, manganese, and nickel salts and one or more impurity salts. The method includes precipitating a first group of impurity salts and the manganese salt to form an aqueous pre-extraction solution. The aqueous pre-extraction solution and an organic extractant solution are mixed to form an aqueous raffinate phase and a loaded organic phase, wherein the aqueous raffinate phase is the aqueous nickel salt solution.

20 Claims, 13 Drawing Sheets

(56) References Cited

U.S. PATENT DOCUMENTS

| | | | | |
|---|---|---|---|---|
| 2023/0257850 | A1* | 8/2023 | Irish | C25C 1/08<br>429/49 |
| 2023/0304128 | A1* | 9/2023 | Akhondi | C22B 15/008 |
| 2024/0002978 | A1 | 1/2024 | Nair et al. | |

FOREIGN PATENT DOCUMENTS

| | | | |
|---|---|---|---|
| WO | 2022219221 | A1 | 10/2022 |
| WO | 2024042115 | A1 | 2/2024 |
| WO | WO 2025-048109 | * | 3/2025 |

OTHER PUBLICATIONS

English translation of CN Publication 114457245, May 2022.*
ISA Korean Intellectual Property Office, International Search Report and Written Opinion Issued in Application No. PCT/US2025/034292, Oct. 22, 2025, WIPO, 11 pages.

* cited by examiner

802

800

METHODS FOR BATTERY-GRADE AQUEOUS SOLUTIONS OF NICKEL SALTS

CROSS REFERENCE TO RELATED APPLICATIONS

The present application claims priority to U.S. Provisional Application No. 63/678,222 entitled, "BATTERY-GRADE NICKEL SOLUTION", filed on Aug. 1, 2024, and U.S. Provisional Application No. 63/754,453 entitled, "METHODS FOR BATTERY-GRADE AQUEOUS SOLUTIONS OF NICKEL SALTS", and filed on Feb. 5, 2025. The entire contents of each of the above-identified applications are hereby incorporated by reference for all purposes.

FIELD

The present description relates generally to methods for producing a battery-grade nickel salt solution from an aqueous mixed metal salt solution.

BACKGROUND/SUMMARY

Many technologies, such as electric vehicles and cellphones to name a few, rely on lithium-ion batteries (LIBs). However, LIBs degrade after a finite number of charging/discharging cycles and thus become spent LIBs and demand replacement. Recycling of spent LIBs to recover metals such as lithium, nickel, cobalt, and/or manganese as battery-grade materials is important to maintaining a critical and circular supply of metals for LIBs. LIB chemistry varies and includes elements in addition to the recovery metals of interest. For example, in addition to lithium, nickel, cobalt, and/or manganese, LIBs may include magnesium, iron, aluminum, copper, and zinc, as well as calcium, chromium, phosphorus, silicon, tin, titanium, and zirconium.

Increasingly, LIBs favor high nickel cathode materials. Forming a battery grade nickel solution from a spent LIB recycling stream provides a cost effective and circular source of nickel salts for new LIBs. Conventionally, separating nickel from a mixed metal source, such as mixed metal mining products, demands multiple liquid/liquid extraction steps followed by crystallization of the nickel salts from the resulting solution to form nickel salts at battery-grade purity levels.

The inventors have recognized the problems discussed above and find the problems may be at least partially addressed by a method for preparing an aqueous nickel salt solution from an aqueous mixed metal salt solution comprising a cobalt salt, a manganese salt, a nickel salt, and one or more impurity salts, the method comprising: precipitating a first group of the impurity salts and the manganese salt from the aqueous mixed metal salt solution to form one or more impurity precipitates, a manganese oxide precipitate, and an aqueous pre-extraction solution; and mixing the aqueous pre-extraction solution and an organic extractant to form an aqueous raffinate phase and a loaded organic phase, wherein the aqueous raffinate phase is the aqueous nickel salt solution and the loaded organic phase comprises the cobalt salt and a second group of the impurity salts. In this way, the unexpected combination of precipitation and liquid/liquid extraction results in a battery-grade aqueous nickel salt solution product formed with a single liquid/liquid extraction. The combination of precipitation and liquid/liquid extraction is a cost effective and efficient method for producing the nickel salt solution which is of battery-grade purity and can be used in the preparation of a cathode active material precursor (pCAM) without further purification.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to methods for preparing an aqueous nickel salt solution from an aqueous mixed metal salt solution, the aqueous mixed metal salt solution including cobalt, manganese, and nickel salts in addition to one or more impurity salts. Cobalt and manganese salts may also be recovered as part of the method for preparing the aqueous nickel salt solution and, with the nickel salt, may be considered target metals for the synthesis of cathode active material precursors. Preparation of the aqueous nickel salt solution may demand removal of both the impurity salts and the cobalt and manganese salts. In a non-limiting example, the source of the aqueous mixed metal solution may be from leaching of a delithiated black mass derived from a recycling stream of spent lithium-ion batteries.

Figure 1:
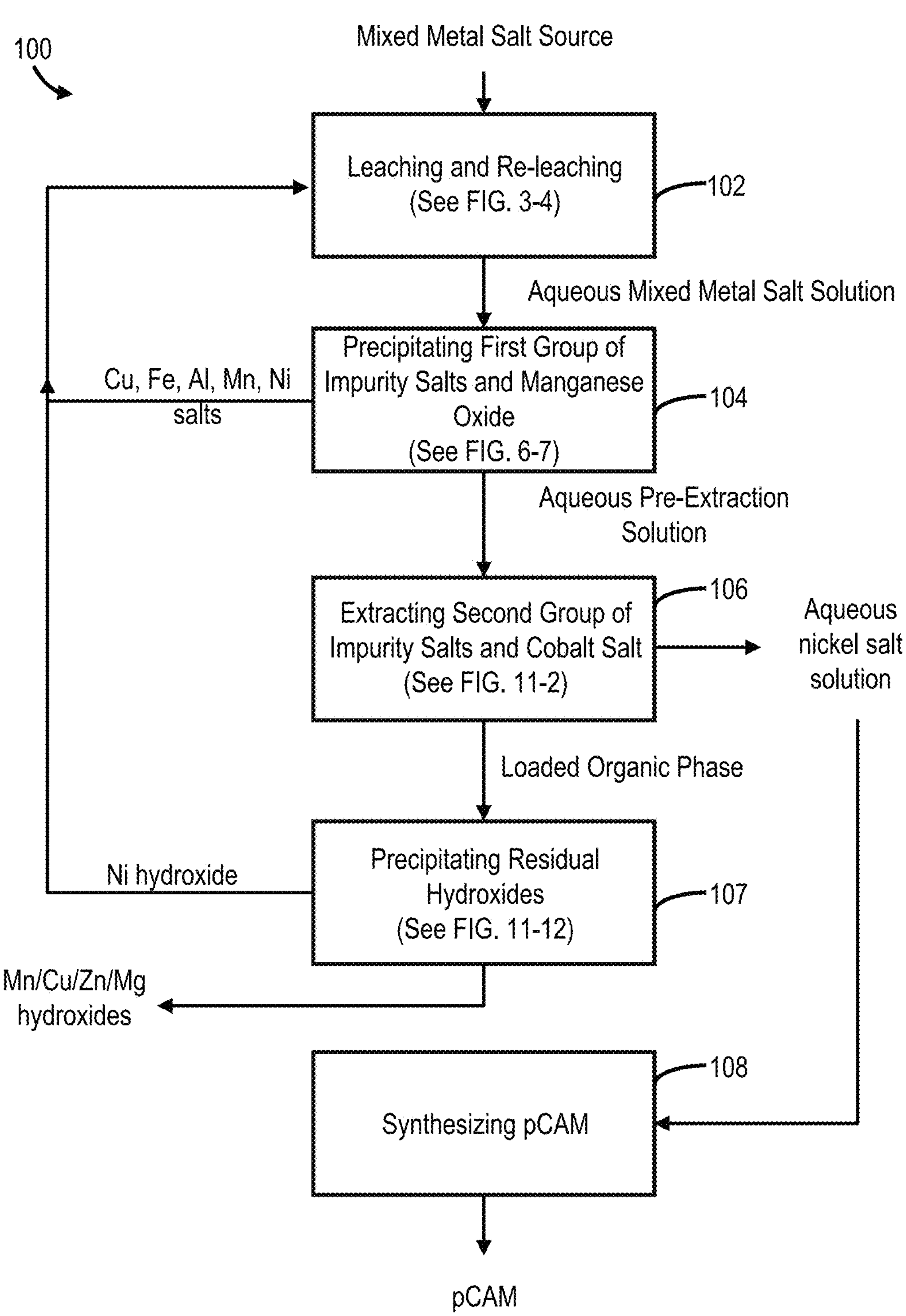
FIG. 1 shows an overview of a method for preparing an aqueous nickel salt solution including a single liquid/liquid extraction.
Figure 2:
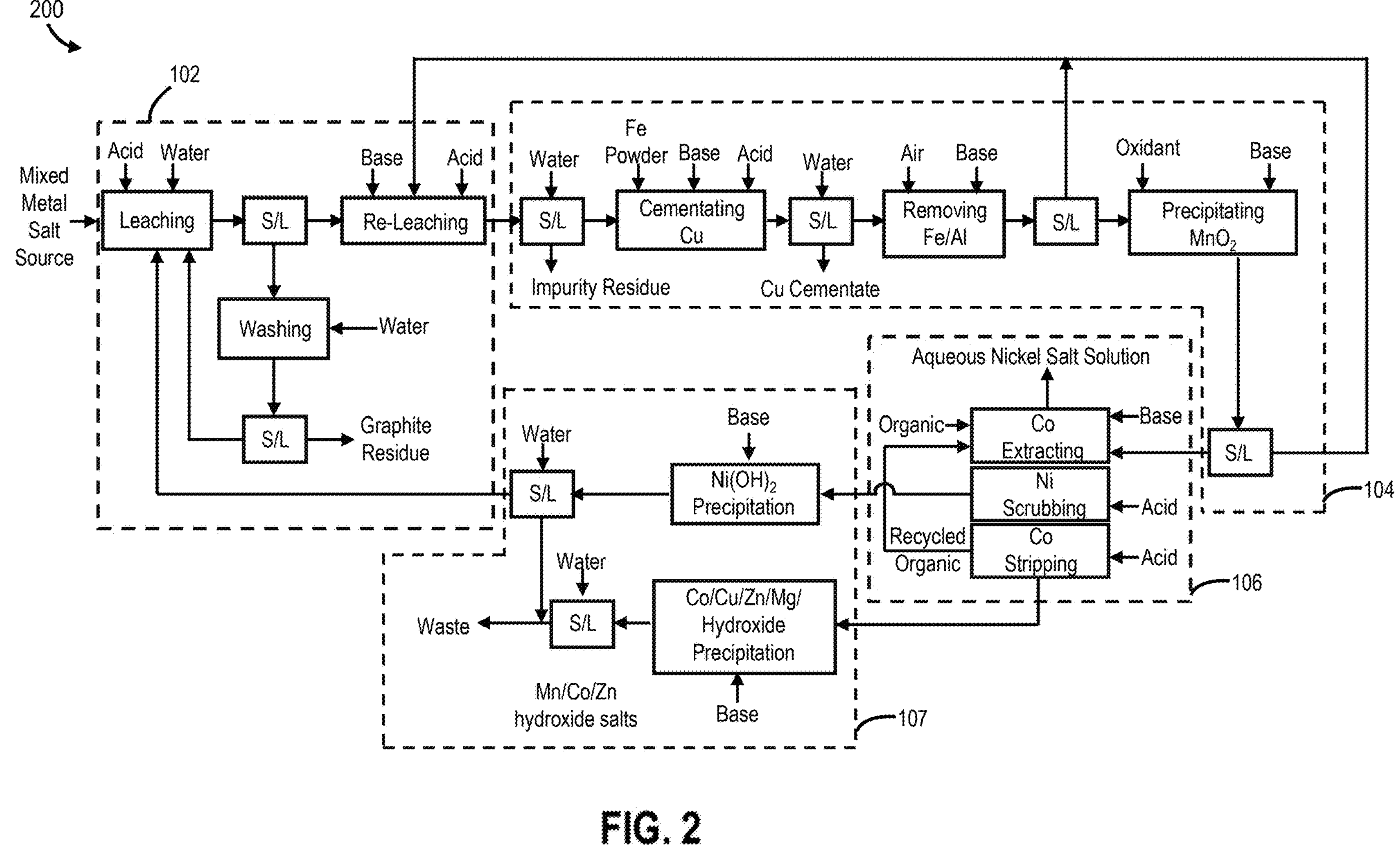
FIG. 2 shows a process flow diagram of the method for preparing an aqueous nickel salt solution including a single liquid/liquid extraction.

Conventionally, preparing an aqueous nickel salt solution from an aqueous mixed metal salt solution demands multiple liquid/liquid extraction steps. In contrast, FIG. 1 shows an outline of a single liquid/liquid extraction method for preparing an aqueous nickel salt solution from an aqueous mixed metal salt solution. A process diagram of the single liquid/liquid extraction method is shown in FIG. 2. This method for preparing an aqueous nickel salt solution with only a single liquid/liquid extraction step may include both leaching and an optional re-leaching as described further in FIGS. 3-4. By including re-leaching, the aqueous nickel salt solution method may be circular and may increase the overall yield of nickel salt in the aqueous nickel salt solution from the mixed metal salt input. The leaching and optional re-leaching may form the aqueous mixed metal salt solution, which is then subjected to precipitation of a first group of the impurity salts and the manganese salt as described in FIGS. 5-10 to produce an aqueous pre-extraction solution. After precipitating the first group of impurity salts and the manganese salt, a second group of impurity salts and the cobalt salt may be extracted from the aqueous pre-extraction solution in a single extraction step to form the aqueous nickel salt solution as described in FIGS. 11-12. Calcium salts may also be removed prior to or after the single extraction step as described in FIGS. 13-14.

An aqueous leachate may be generated from battery black mass and may include nickel, manganese, and cobalt salts as well as additional impurity salts such as magnesium salts, aluminum salts, iron salts, copper salts, calcium salts, chromium salts, phosphorus salts, silicon salts, tin salts, titanium salts, and zirconium salts. Battery black mass herein refers to a granular mass of crushed lithium-ion battery materials including cathode and anode materials. Conventionally, the manganese, cobalt, and impurity salts are separated from the nickel salts by a series of liquid/liquid extraction steps. In particular, distinct liquid/liquid extraction steps are used for extracting each of the manganese, cobalt, and magnesium salts. For example, in a first liquid/liquid extraction step, manganese ions are partitioned into a first loaded organic phase and cobalt ions, magnesium ions, and nickel ions remain in a first aqueous raffinate. The first aqueous raffinate is then passed to a second liquid/liquid extraction step where cobalt ions are partitioned into a second loaded organic phase while the magnesium and nickel ions remain in the second aqueous raffinate. The second aqueous raffinate is then passed to a third liquid/liquid extraction step where magnesium ions are partitioned into the third loaded organic phase and nickel salts remain in the third aqueous raffinate. Even after the three liquid/liquid extraction processes, the third aqueous raffinate including the nickel ions may not be of sufficient purity to use in the synthesis of cathode active material precursors (e.g., may not be battery-grade). For this reason, the third aqueous raffinate is often subjected to a crystallization process to produce isolated solid nickel salts.

The inventors herein recognized that a process which decreases the number of liquid/liquid extraction steps and does not demand a crystallization process would help reduce capital and operational expenses related to generating battery-grade nickel salt solutions from a mixed metal salt starting material, such as a battery black mass. Partitioning impurity salts via precipitation and solid/liquid extraction may also reduce the demand for expensive organic solvents and may be more efficient to operate when compared to liquid/liquid extraction using an aqueous phase and an organic extractant.

Thus, FIG. 1 shows an overview of a non-limiting example of a method 100 for producing an aqueous nickel salt solution from a mixed metal salt starting material using a single liquid/liquid extraction. An example of a process flow 200 for the steps of method 100 is shown in FIG. 2. The mixed metal salt starting material may be a battery black mass, such as a delithiated battery black mass, generated from spent lithium-ion batteries or a mixed hydroxide precipitate (MHP), which is an intermediate product in the processing of nickel and cobalt from laterite ores. Delithiated battery black mass may be battery black mass which is heat treated in a reduced oxygen atmosphere, such as a nitrogen atmosphere containing less than 0.1 vol % oxygen, at a high temperature, such as a temperature in a range of from 500° C. to 1000° C., and then leached with an aqueous lithium leach solution, such as water, to remove lithium materials. Other mixed metal salt sources are also considered. In some examples, other mixed metal salt sources may be similarly delithiated (e.g., heated in reduced oxygen atmosphere and washed with a lithium leaching solution).

At 102, the mixed metal salt starting material (source) is subjected to leaching to produce an aqueous mixed metal salt solution. The aqueous mixed metal salt solution may also be referred to as an aqueous leachate. Leaching includes mixing the mixed metal salt input (source) and an aqueous leach solution, such as an acidic aqueous leach solution, to produce the aqueous mixed metal salt solution. Leaching causes soluble metal salts in the solid phase of the mixed metal salt input to be transferred to the liquid phase as an aqueous solution of ions, and the composition of this solution will depend on the composition of the mixed metal salt starting material. For example, the aqueous mixed metal salt solution may include nickel, manganese, and cobalt salts in addition to one or more impurity salts. An example of the leaching and of a corresponding re-leaching at 102 is diagrammed as indicated in FIG. 2 and is described further below with respect to FIGS. 3-4.

At 104, the method of preparing the aqueous nickel salt solution includes precipitating a first group of the impurity salts and a manganese salt from the aqueous mixed metal salt solution. The first group of impurity salts may include a copper salt, an iron salt, and an aluminum salt. Precipitating the first group of impurity salts and the manganese salt may occur in a single step or may include a series of steps which selectively causes the impurity salts to precipitate out from the aqueous mixed metal salt solution as one or more impurity precipitates and the manganese salt to precipitate out as a manganese oxide precipitate. Precipitation may form a mixture of these precipitates.

Some of the nickel salt may co-precipitate or become entrained in the precipitate as a result of this step. If desired, to recover nickel lost from the aqueous metal salt solution, the precipitated first group of impurity salts and the manganese oxide precipitate may be added back, separately or combined, for re-leaching at 102. An example of a process for step 102 is shown in FIG. 2. Precipitating the first group of impurity salts and the manganese salt is described further below with respect to FIGS. 6-7. Precipitating the first group of impurity salts and the manganese salt results in an aqueous pre-extraction solution.

At 106, the method of preparing an aqueous nickel salt solution includes extracting the cobalt salt and a second group of the impurity salts from the aqueous pre-extraction solution. As shown, extracting is a single liquid/liquid extraction stage which produces an aqueous solution of a nickel salt that is of battery-grade purity to be fed into a cathode active material precursor (pCAM) synthesis at 108. The resulting pCAM can be used to produce cathode active material (CAM). For example, the pCAM synthesis may produce nickel manganese cobalt (NMC) hydroxides which may be used to produce NMC cathode active materials in a lithium sintering process (e.g., lithium nickel manganese cobalt oxide). The combination of precipitating the first group of impurity salts and the manganese salt followed by a single liquid/liquid extraction of the cobalt salt and the second group of impurity salts results in a battery-grade aqueous nickel salt solution that can be used directly in pCAM synthesis. In some examples, the single liquid/liquid extraction may be the only liquid/liquid extraction used to form the aqueous nickel salt solution from the aqueous mixed metal salt solution. An example process for extracting the second group of impurity salts and the cobalt salt at step 106 is shown in FIG. 2. Extracting the cobalt salt and the second group of impurity salts is described further below with respect to FIGS. 11-14.

As shown in FIG. 1, the loaded organic phase resulting from extraction of the second group of impurity salts and the cobalt salt can optionally be further treated at 107 to precipitate an additional amount of the nickel salt. For example, as further shown in FIG. 2, nickel hydroxide may be precipitated from an aqueous raffinate resulting from scrubbing (e.g., re-extracting) of the loaded organic phase with an aqueous acidic solution. As a further example, the loaded organic phase resulting from scrubbing may be stripped, and manganese hydroxide, cobalt hydroxide, magnesium hydroxide and/or zinc hydroxide may be precipitated from the resulting stripping aqueous raffinate, thereby providing a recycled organic solution for future use.

Figure 3:
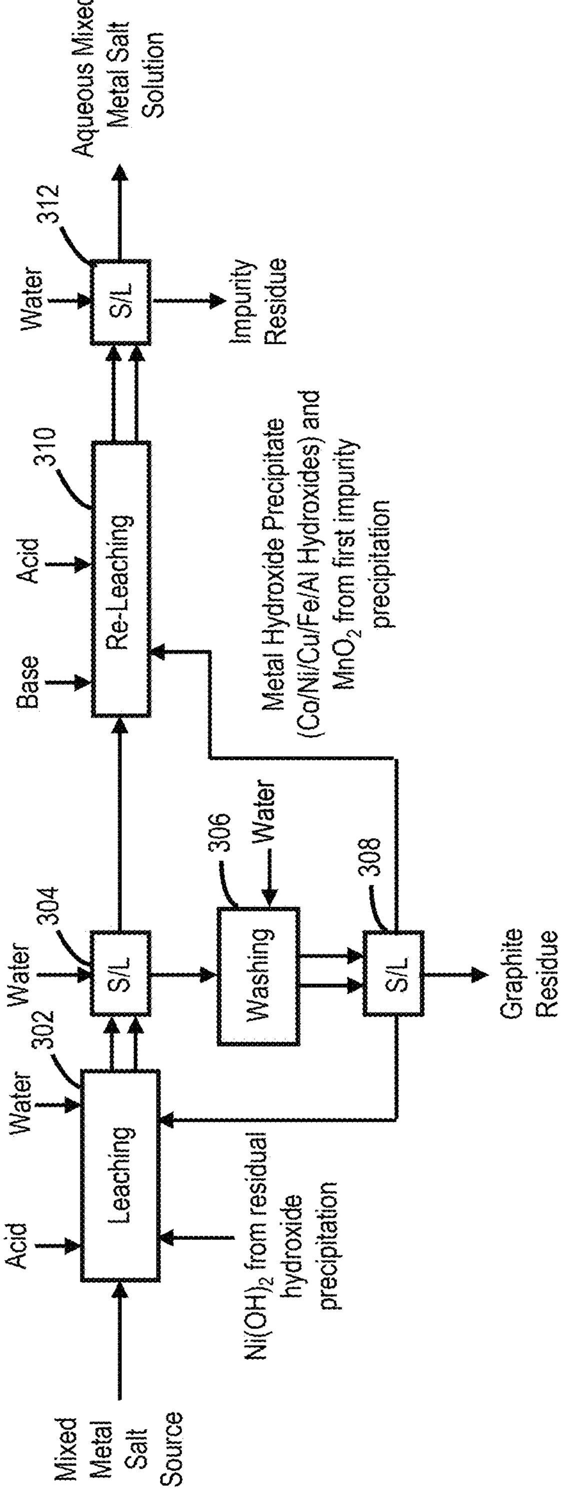
FIG. 3 shows a process flow diagram of a leaching and re-leaching step of the method for preparing an aqueous nickel salt solution including a single liquid/liquid extraction.

FIG. 3 shows an example of a process flow diagram 300 of leaching and re-leaching (e.g., 102) of a mixed metal salt input as part of the method outlined in FIGS. 1-2. At 302, a solid mixed metal salt source is combined with an acidic aqueous leach solution. The mixed metal salt source may be, for example, a delithiated battery black mass, a mixed hydroxide precipitate (MHP), or other delithiated mixed metal salt input as discussed above with respect to FIG. 1. As a specific example, the mixed metal salt source may be a heat-treated delithiated battery black mass. The acidic aqueous leach solution has a pH that is sufficiently low that nickel salts as well as other impurity salts partition into the aqueous liquid phase from the solid mixed metal salt phase. The acid may be a strong acid (e.g., an acid that fully dissociates in water) such as sulfuric acid. As shown in FIG. 3, nickel hydroxide resulting from the residual hydroxide precipitation may also be leached along with the mixed metal salt source at leaching 302. Throughout this disclosure, water may be, for example, substantially pure water at a substantially neutral pH.

The resulting mixture undergoes solid/liquid separation at 304. The separated solid phase may be washed with additional water at 306 and may undergo solid/liquid separation at 308. The majority of the solid phase separated at 308 is typically a graphite residue. The aqueous liquid phase resulting from separation at 306 may include metal ions, including nickel salts, and may be at least partially directed back to leaching 302.

As shown in FIG. 3, the aqueous liquid phase separated at 304 may be directed to a re-leaching stage at 310. Additionally, the liquid phase separated from washing at 308 may also be directed to re-leaching. Metal hydroxide precipitates from the first group of impurity salts may also be added for re-leaching at 310. Metal hydroxide precipitates may include one or more of cobalt hydroxide, nickel hydroxide, copper hydroxide, iron hydroxide, and aluminum hydroxide. Additionally, or alternatively, $MnO_2$ precipitated in the first impurity precipitation may also be added in the re-leaching process. The re-leaching solution at 310 may be treated with a base and/or an acid as needed to adjust the pH to a re-leaching pH. A variety of bases, particularly water soluble bases, may be used. As a specific example, the base may be nickel hydroxide, such as the nickel hydroxide resulting from scrubbing of the aqueous raffinate described above (e.g., 107 in FIG. 2). Re-leaching may occur under the same or similar conditions to leaching 302. In this way, remaining metal salts, particularly Ni salts lost during the process, may be recovered.

The re-leaching mixture undergoes solid/liquid separation at 312 and can be washed with additional water. The solid phase comprises impurity residues which may be directed to waste. The aqueous phase resulting from separation at 312 is the aqueous mixed metal salt solution which may then be used for precipitation of the first group of impurity salts and manganese salts stage of the present method.

Figure 4:
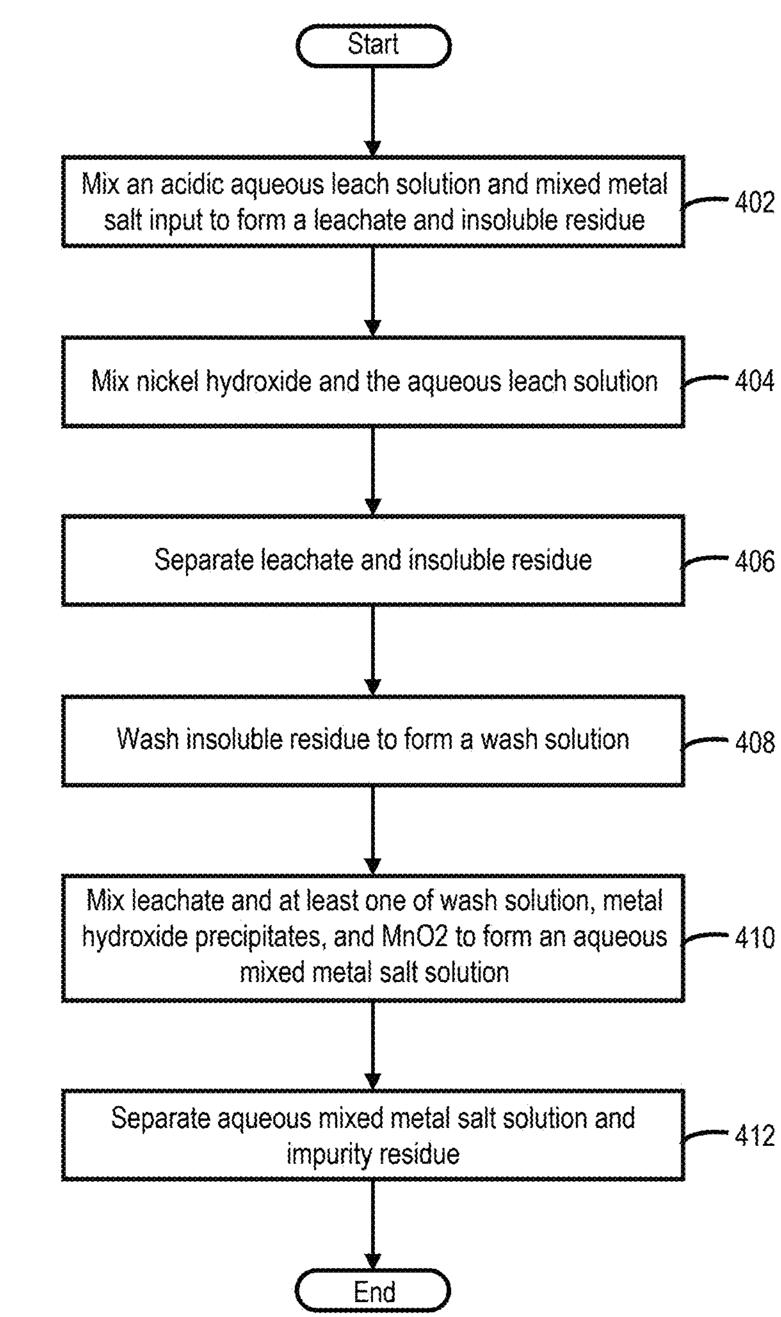
FIG. 4 shows a flowchart of an example of a method for leaching and re-leaching according to the method for preparing an aqueous nickel salt solution including a single liquid/liquid extraction.

FIG. 4 shows a flowchart of an example of a method 400 for leaching and re-leaching. Leaching and re-leaching may be step 102 of FIG. 1 or FIG. 2 and may follow the process flow diagram of FIG. 3. At 402, method 400 includes mixing an acidic aqueous leach solution and a mixed metal salt input to form a leachate and an insoluble residue (e.g., 302 of FIG. 3). Mixing may include agitating the solid phase mixed metal salt source in the presence of the acidic solution to cause dissolution of metal salts in the acidic solution. As discussed above with respect to FIG. 3, the mixed metal salt input may be a delithiated battery black mass, and the resulting leachate may be a delithiated battery black mass leachate. In particular, the mixed metal salt input may be a heat-treated delithiated battery black mass, as described in more detail above relating to FIG. 1 and FIG. 2. The acidic aqueous leach solution may be an aqueous solution of a strong acid such as sulfuric acid or the like at a concentration in a range of from 1 M to 7 M. In some examples, the temperature of the acidic solution during mixing may be in a range of from 50° C. to 90° C. The acidic aqueous leach solution may optionally include a redox reagent such as hydrogen peroxide. However, when the mixed metal salt input is a heat-treated delithiated black mass, the use of a redox reagent in the acidic aqueous leach solution may be unnecessary.

At 404, method 400 optionally includes mixing nickel hydroxide and the acidic aqueous leach solution. In an exemplary embodiment, the nickel hydroxide is nickel hydroxide recovered from extracting the second group of impurity salts and the cobalt salt as part of the method of FIG. 1. Mixing the nickel hydroxide and the acidic aqueous leach solution may be done under substantially the same pH and temperature conditions as mixing the mixed metal salt input and the acidic aqueous leach solution at 402. Further, mixing the nickel hydroxide and the acidic aqueous leach solution may occur at substantially the same time as mixing the acidic aqueous solution and the mixed metal salt input.

At 406, method 400 includes separating the leachate and insoluble residue (e.g., 304 of FIG. 3). Separating may include solid/liquid separation processes, such as, but not limited to, filtration (such as vacuum/pressure filtration), gravity settling, and centrifugal separation. In one example, the insoluble residue separated from the leachate may include graphite.

At 408, method 400 includes washing the insoluble residue to form a wash solution (e.g., 306 of FIG. 3). Washing may include mixing the insoluble residue and water to form a wash solution. The wash solution and insoluble residue may then be separated. In some examples, the wash solution may be added to the acidic solution at step 402 to reintroduce any metal ions removed from the insoluble residue back into the leachate.

At 410, method 400 includes mixing the leachate and one or more of the wash solution, the metal hydroxide precipitates, and the manganese (IV) oxide ($MnO_2$) to form a re-leaching mixture (e.g., 310 of FIG. 3). The metal hydroxide precipitates may include nickel, cobalt, copper, iron, and aluminum hydroxides. The metal hydroxides and the $MnO_2$ may be formed during the first group of impurity salt and manganese salt precipitation as described above. In this way, target metal salts such as nickel salts that are mixed in with the precipitates may be recovered, and the overall percent yield of nickel may be increased. In addition, portions of cobalt salts, manganese salts, and copper salts may also be recovered. During mixing, the leachate and/or wash solution may be held at a re-leaching temperature in a range from 20° C. to 60° C. In further examples, the re-leaching temperature may be in a range of from 20° C. to 30° C.

Also, if necessary, the pH of the leachate, the wash solution, and/or the resulting re-leaching mixture can be adjusted to a re-leaching pH. It is understood that adjusting the pH may occur at the same time as mixing at step 410. Adjusting the pH may include adding an acid to the leachate, the wash solution, or the re-leaching mixture, such as a strong acid including sulfuric acid, to lower the pH of the re-leaching solution. Adjusting the pH may, additionally or alternatively, include adding a base to the re-leaching mixture to increase the pH. The base may be a strong hydroxide base, such as sodium hydroxide, nickel hydroxide or other NMC hydroxides. The re-leaching pH may be selected to maximize nickel recovery while minimizing re-leaching of impurity ions, such as iron or aluminum ions. The re-leaching pH may be higher than the pH of the acidic aqueous leach solution. The re-leaching pH may be in a range of from 1 to 3, such as from 1.5 to 2.5.

Effects of pH on re-leaching are shown experimentally by combining mixed metal hydroxides and manganese oxide with deionized water adjusted to a pH in the range of 1.5 to 2.5. Results are shown in graph 500 of FIG. 5. Graph 500 shows percent removal as a function of pH. Percent removal was determined by inductively coupled plasma-optical emission spectroscopy (ICP-OES) and indicates the percent of a metal ion partitioned into the re-leaching solution from the metal hydroxide and/or manganese oxide solid phase. First plot 502 corresponds to percent removal of iron ions, second plot 504 corresponds to a percent removal of aluminum ions, third plot 506 corresponds to a percent removal of nickel ions, and fourth plot 508 corresponds to a percent removal of copper ions. Table 1 below corresponds to the plots shown in FIG. 5 and further includes percent removal of manganese ions and cobalt ions.

TABLE 1

Percent removal of metals at a re-leaching pH

| | Percent Removal | | | | | |
|---|---|---|---|---|---|---|
| pH | Ni | Co | Mn | Fe | Al | Cu |
| 2.5 | 54 | 78 | 84 | 1 | 28 | 84 |
| 2 | 93 | 62 | 91 | 28 | 62 | 100 |
| 1.5 | 100 | 94 | 80 | 74 | 88 | 94 |

Note:
In this and in any tables that follow, % means wt % unless otherwise indicated.

Figure 5:
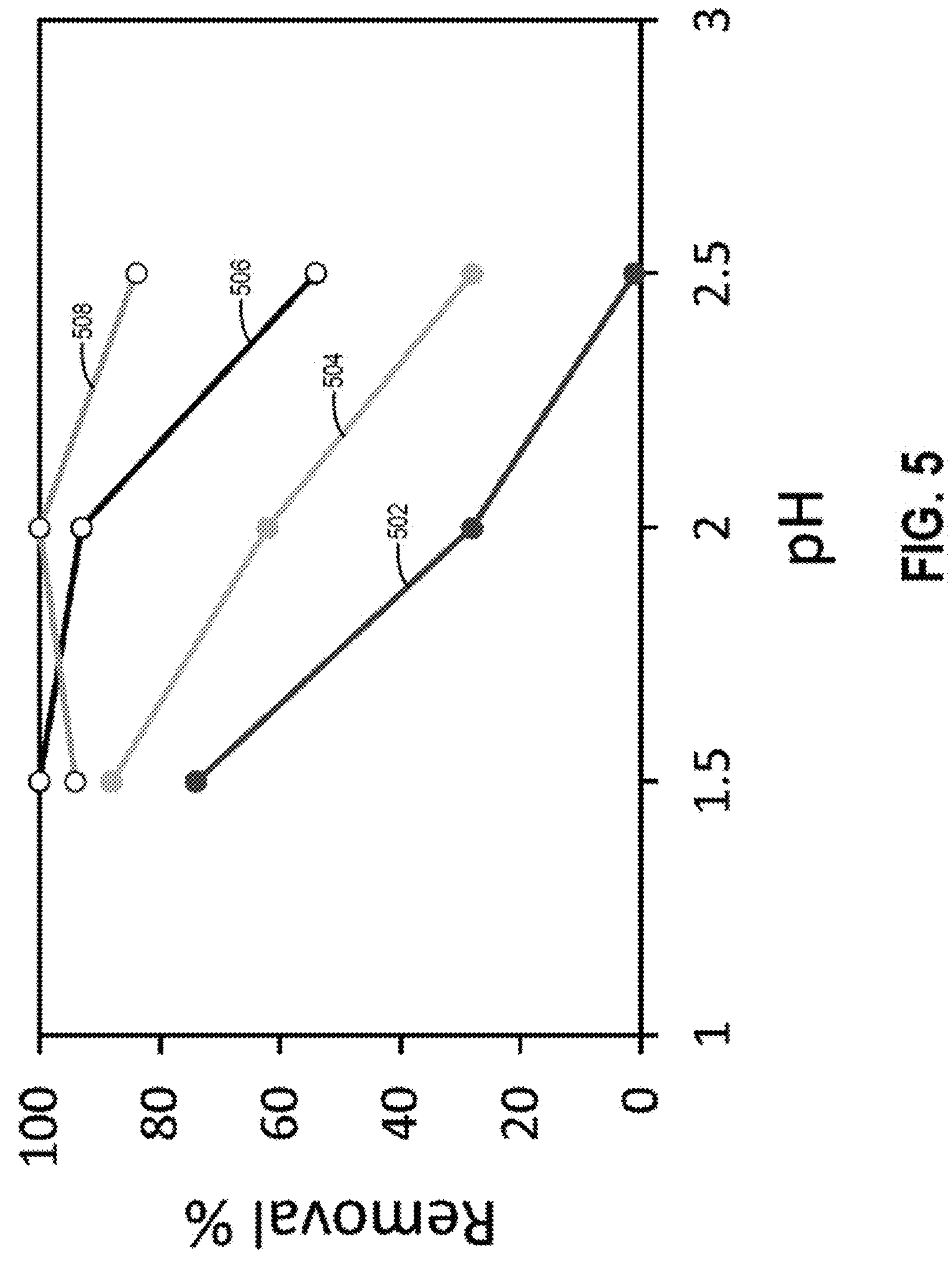
FIG. 5 shows a graph of removal percent as a function of pH during re-leaching.

As shown in FIG. 5 and Table 1, the increase in percent removal with pH is different for different metal ions. In this way, the pH may be adjusted to the re-leaching pH to maximize nickel removal while minimizing removal of impurity ions such as aluminum and iron.

Returning to method 400, at 412, method 400 includes separating the aqueous mixed metal salt solution and the impurity residue (e.g., 312 of FIG. 3). The aqueous mixed metal salt solution may then be directed to the process for precipitating the first group of impurity salts and the manganese salt as described further below with respect to FIGS. 6-9. The impurity residue may be waste material. Method 400 ends.

Figure 6:
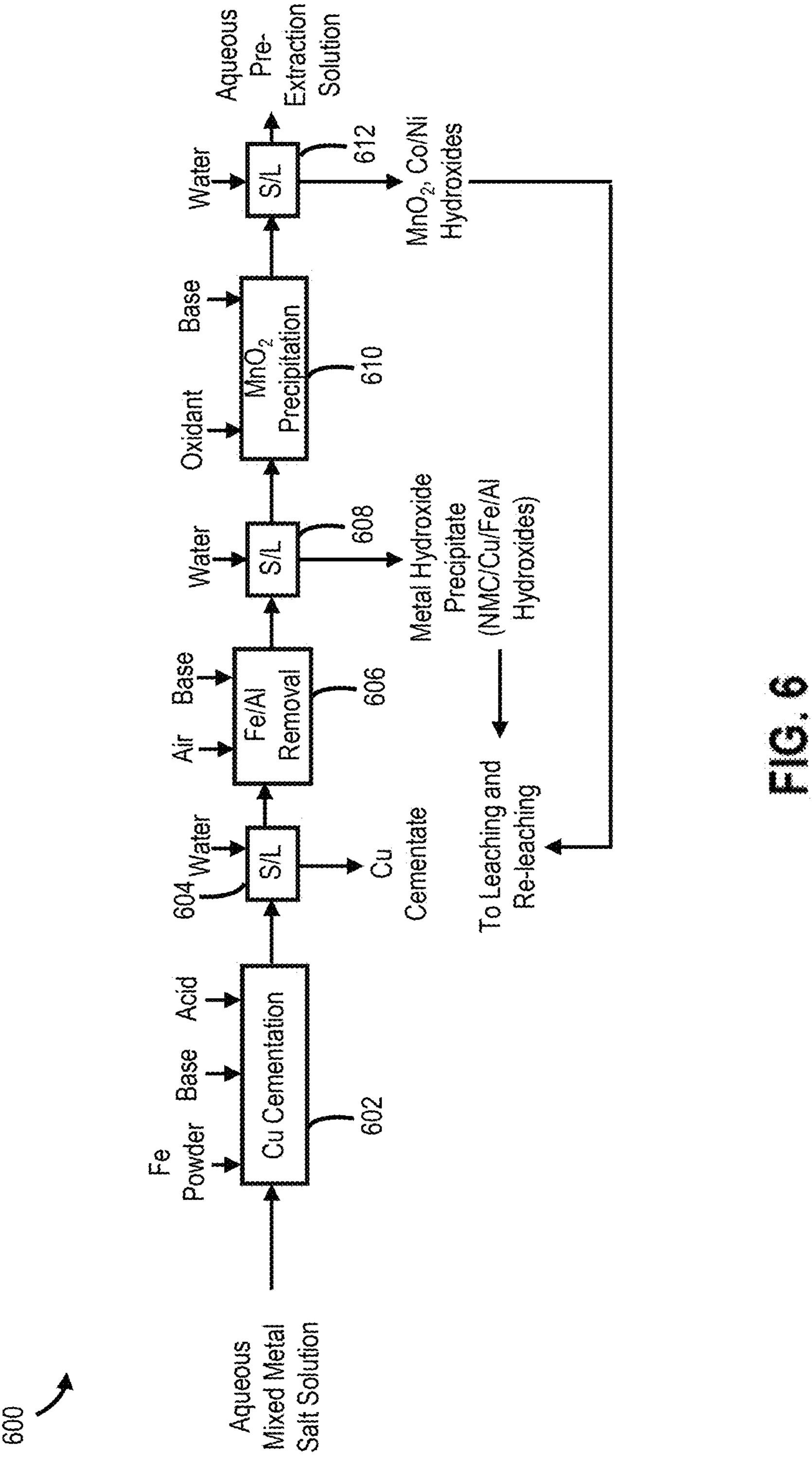
FIG. 6 shows a process flow diagram of the step of precipitating a first group of impurity salts and a manganese salt in the method for preparing an aqueous nickel salt solution including a single liquid/liquid extraction.

FIG. 6 shows a process flow diagram 600 of an example of a process for precipitating the first group of the impurity salts and the manganese salt corresponding to step 104 of FIG. 1. The aqueous mixed metal salt solution formed from leaching and optional re-leaching as discussed above is the input for precipitating the first group of impurity salts and the manganese salt. As further described below, precipitating the first group of impurity salts and the manganese salt may include one or more of cementation, base hydrolysis, and oxidation. Cementation, base hydrolysis, and oxidation may each be considered precipitation processes. Both the type of precipitation process and the order of the precipitation processes as described below may synergistically provide the unexpected benefit of efficiently producing the aqueous pre-separation solution from which a battery grade aqueous nickel salt solution is produced via a single liquid/liquid extraction.

For example, at 602, the aqueous mixed metal salt solution undergoes copper cementation. Cementation is a type of precipitation using a metallic reagent to reduce a metal cation to a zero oxidation state. In the present method, example reagents added for copper cementation include iron, nickel, or manganese powder and an acid, such as sulfuric acid, along with a base, such as sodium hydroxide, nickel hydroxide, or other NMC hydroxides. The metal powder, such as iron powder, is present to reduce the copper ions in solution to metallic copper, which preferably occurs at a cementation pH that is acidic. The added acid may be a strong acid. The base can be added to adjust the pH of the aqueous mixed metal solution when the cementation is complete. In this process, the copper cementation forms a copper depleted solution and a copper cementate. The copper cementate would be an example of a copper precipitate.

At 604, a solid-liquid separation is used to separate the copper cementate and copper depleted solution. As shown, water may be added to assist in the separation as well as to wash the solid residue free of remaining entrained materials. The copper cementate may be substantially metallic copper and may not include significant quantities of nickel salts. The copper cementate may be directed to waste or other processing streams demanding metallic copper and may not be directed to re-leaching, or the copper cementate may be sold to down-stream customers. It was found that copper cementation of a leachate containing nickel, manganese, and cobalt salts and a first group of impurity salts comprising Cu salts could result in greater than 99.8% Cu removal.

The process for precipitating the first group of the impurity salts may also include precipitation of impurities including iron and aluminum as well as precipitation of manganese oxide. These steps may occur in either order depending, for example, on the relative amounts of the impurities and on the relative precipitation pH's.

For example, as shown in FIG. 6, at 606, the copper depleted solution undergoes iron and aluminum removal. Reagents added for iron and aluminum removal include a base and an oxygen-containing gas, such as air. The oxygen-containing gas may be added into the copper depleted solution by bubbling. Also, if the iron and aluminum removal is combined with manganese oxide precipitation, discussed in more detail below, the oxygen-containing gas may be oxygen combined with $SO_2$. The base may be added to increase the pH of the copper depleted solution to an hydroxide precipitation pH to cause dissolved iron and aluminum ions to precipitate as one or more metal hydroxides (e.g., iron hydroxide and aluminum hydroxide). In this way, the removal of iron and aluminum at 606 may be caused by base hydrolysis to form the one or more metal hydroxides. Base hydrolysis may herein refer to the reaction of metal cations with hydroxide ions in water to form metal hydroxide precipitates.

At 608, the one or more metal hydroxide precipitates and the nickel enriched solution are separated. As shown, water may be added to assist in the separation as well as to wash the precipitate free of entrained materials. The one or more metal hydroxides may include iron hydroxide and aluminum hydroxide. The one or more metal hydroxides may further include copper hydroxide formed from copper remaining in the copper depleted solution after copper cementation.

The mixed metal hydroxides may further include residual nickel in the form of nickel hydroxide in addition to manganese hydroxide and cobalt hydroxide. For this reason, the one or more metal hydroxides may be directed to re-leaching as discussed above in FIGS. 3-4 to maximize recovery of nickel. Iron and aluminum removal at 606 forms a nickel enriched solution.

At 610, the nickel enriched solution is subjected to manganese oxide ($MnO_2$) precipitation. Reagents added for manganese oxide precipitation include an oxidant and a base. In some examples, the oxidant may be a combination $SO_2$ and an oxidizing gas, such as $O_2$ or air, and it may be mixed with the nickel enriched solution by bubbling. The base may be mixed with the nickel enriched solution to maintain the pH at a manganese oxide precipitation pH. Specifically, manganese oxidation precipitation would be expected to generate acid, and a base may be added in order to maintain the manganese oxidation at the target manganese oxide precipitation pH. In other embodiments, the oxidant may be an oxidizing agent such as an aqueous solution of a persulfate salt, including sodium persulfate or potassium persulfate. Precipitating the manganese oxide from the nickel enriched solution forms an aqueous pre-extraction solution.

In specific examples of suitable manganese oxide precipitations using an oxidizing gas, it was found that the kinetics of the Mn oxidation and precipitation of $MnO_2$ are very slow, even at 60° C. However, complete manganese removal can be achieved after 10 hrs, and the concentration of Mn salt in the aqueous pre-extraction solution can be reduced to 1 ppm. Thus, >99.9% of the manganese salt may be removed from the nickel enriched solution, while only 2% of the nickel salt co-precipitated with the manganese oxide, based on ICP analysis of the precipitate.

At 612, the aqueous pre-extraction solution and manganese oxide precipitate are separated. Water may be added to assist in the separation as well as to wash the precipitate free of entrained materials. Along with the manganese oxide precipitate, cobalt and residual nickel precipitates, which may be in the form of hydroxides, may also form and are also separated at 612. The manganese oxide and the cobalt and nickel hydroxides can also be directed to re-leaching as discussed above to maximize recovery of nickel. The aqueous pre-extraction solution may then be directed to extracting the cobalt salt and the second group of impurity salts. The aqueous pre-extraction solution may include the cobalt salt, the nickel salt, and the magnesium salt, as well as, in some cases, calcium salts, copper salts, zinc salts, and aluminum salts. By precipitating the manganese salt, in addition to the copper, iron, and aluminum salts, the aqueous pre-extraction solution is in a condition to undergo a single extraction to form the aqueous nickel salt solution of a battery-grade purity to be added directly to a pCAM synthesis.

Figure 7:
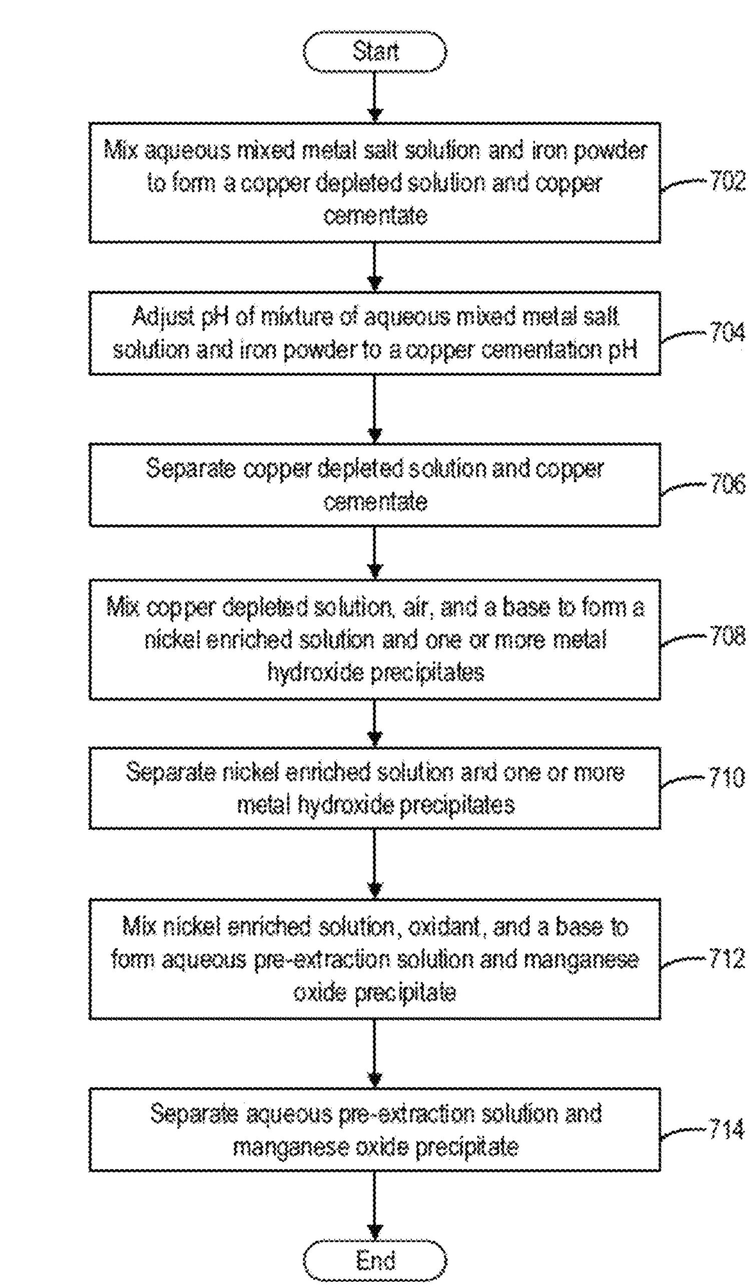
FIG. 7 shows a flowchart of an example of a method for precipitating the first group of impurity salts and the manganese salt according to the method for preparing an aqueous nickel salt solution including a single liquid/liquid extraction.

FIG. 7 shows a flowchart of an example of a method 700 for precipitating a first group of impurity salts and a manganese salt. Precipitating the first group of impurity salts and the manganese salt may be the step 104 of FIG. 1 and may follow the process flow diagram of FIG. 6.

At 702, method 700 includes mixing the aqueous mixed metal salt solution and iron powder to form a copper depleted solution and a copper cementate (e.g., 602 of FIG. 6). Mixing may include agitating the iron powder and the aqueous mixed metal salt solution to cause a cementation reaction between the copper ions of the mixed metal salt solution and the iron powder. The aqueous mixed metal salt solution may be the aqueous mixed metal salt solution produced at the end of method 400. The iron powder may be added in molar excess of the copper ion concentration of the aqueous mixed metal salt solution. As one example, the molar ratio of iron ions to copper ions may be from about 1.5 to about 2.5, such as from about 1.8 to about 2.2. During mixing, the temperature of the aqueous mixed metal solution may be increased above room temperature. As one example the temperature of the aqueous mixed metal solution during mixing may be from about 80° C. to 90° C. The mixing at 702 may occur for a cementation residence time. As one example the cementation residence time may be from about 15 to about 45 minutes, such from about 20 minutes to about 40 minutes.

At 704, method 700 includes adjusting the pH of the mixture of the aqueous mixed metal salt solution and the iron powder to a copper cementation pH. Adjusting the pH may include adding an acid and/or a base to the mixture to increase or decrease the pH respectively to reach the copper cementation pH. Adjusting the pH may occur prior to, at the same time as, or after the mixing at step 702. For example, the pH may be monitored during the cementation residence time and adjusted accordingly to be at the copper cementation pH, such as from about 1.5 to about 4, including from about 2 to about 3.

At 706, method 700 includes separating the copper depleted solution and the copper cementate (e.g., 604 of FIG. 6). As discussed above, the copper cementate may be a precipitate that may include metallic copper but may not include a substantial amount of nickel ions. For this reason, the copper cementate may not need to be directed to re-leaching.

In the particular example shown in FIG. 7, at 708, method 700 includes mixing the copper depleted solution, a base, and air to form a nickel enriched solution and one or more metal hydroxide precipitates (e.g., 606 of FIG. 6). Mixing air may include bubbling air into the copper depleted solution. The base may be a strong base, such as an hydroxide base. Further mixing may cause base hydrolysis of the metal salts to form metal hydroxides. In some examples, the hydroxide base may be sodium hydroxide, nickel hydroxide, other NMC hydroxides or the like. In some examples, mixing may include mixing in stages including a first mixing and a second mixing. In such examples, the first mixing may include mixing a strong base such as sodium hydroxide and the second mixing may include mixing a weak base such as calcium hydroxide. Mixing the base and air may increase the equilibrium pH of the copper depleted solution to a base hydrolysis pH. As one example, the base hydrolysis pH may be in a range of from 3 to 6.2. In some examples, the base hydrolysis pH may be in a range of from 3 to 5.7. In some examples, the base hydrolysis pH may be in a range of from 4.6 to 5.7. The copper depleted solution may be heated during mixing. As one example, the temperature of the copper-depleted solution may be in range of from 80° C. to 95° C. during mixing at 708.

At 710, method 700 includes separating the nickel enriched solution and one or more metal hydroxide precipitates (e.g., 608 of FIG. 6). The separated one or more metal hydroxide precipitates may include nickel hydroxide and may then be directed to re-leaching as discussed above with respect to FIGS. 3-4.

It has been found that mixing the aqueous metal salt solution and iron powder to form a copper precipitate followed by mixing of the resulting copper depleted solution with base and air unexpectedly increases the filterability (e.g., a separation efficiency) of the metal hydroxide precipitate without negatively impacting the percent removal of the nickel salt. Without being bound by theory, it is believed that, with the copper salts having already been removed, this avoids the problem that Cu hydroxide precipitation can adversely impact the filterability of solids since they form very fine particles at a pH of 5 to 5.5. The absence of Cu hydroxide and the presence of crystalline iron hydroxide (goethite) may dramatically improve filterability, limiting loss of nickel salts.

Figure 8:
FIG. 8 shows photographs comparing filter cakes of one or more metal hydroxide precipitates from a copper depleted solution as a part of precipitating the first group of impurity salts according to the method for preparing an aqueous nickel salt solution including a single liquid/liquid extraction, with filter cakes of one or more metal hydroxide precipitates from an aqueous mixed metal solution.
Figure 8:
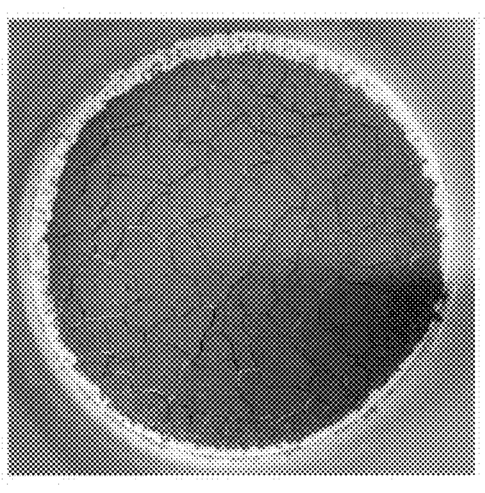
Figure 8:
Figure 8:
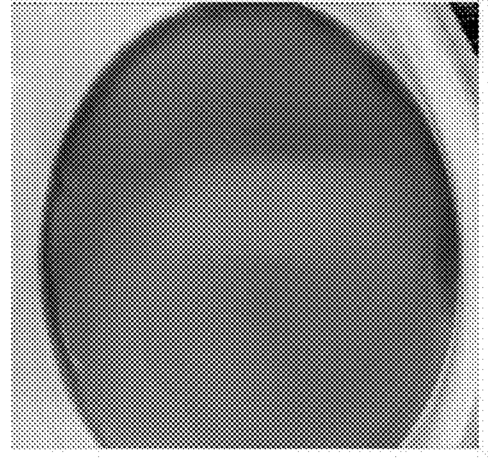
Figure 8:
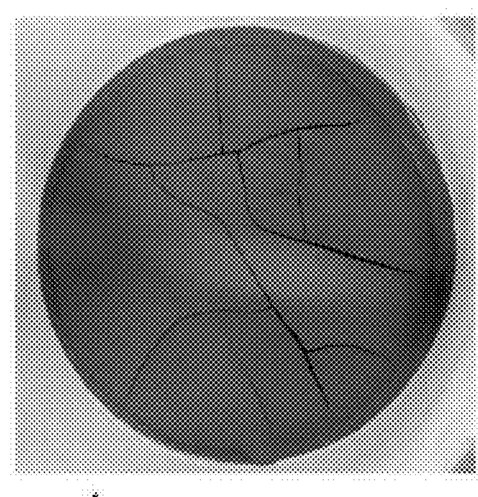
Figure 8:

FIG. 8 shows photographs of filter cakes of metal hydroxide precipitates separated by filtration. First photograph 800 shows a wet filter cake of one or more metal hydroxide precipitates resulting from mixing the aqueous mixed metal solution with base and air. Second photograph 802 shows the filter cake of first photograph 800 after drying. Third photograph 804 shows a wet filter cake of one or more metal hydroxide precipitates resulting from mixing the copper depleted solution with base and air. Fourth photograph 806 shows the filter cake of third photograph 804 after drying.

Third photograph 804 and fourth photograph 806 show a filter cake that includes little to no copper hydroxide having larger particles that are more easily filtered, forming the cracking in the filter cakes. This is compared to first photograph 800 and second photograph 802 which includes fine copper hydroxide particles forming the smooth wet filter cake resulting from the smaller copper hydroxide particles which are harder to filter.

At 712, method 700 includes mixing the nickel enriched solution with an oxidant and a base to form an aqueous pre-extraction solution and a manganese oxide ($MnO_2$) precipitate (e.g., 610 of FIG. 6). The oxidant may be an oxidizing gas, and mixing in addition to agitating may include bubbling the gaseous oxidant into the nickel enriched solution. In one example, the oxidant includes sulfur dioxide ($SO_2$) and oxygen ($O_2$). The volume % of sulfur dioxide to volume % of oxygen is determined experimentally by one of ordinary skill in the art generally includes greater than 50 vol % oxygen, such as from 1-30% by volume sulfur dioxide and 70-99% by volume oxygen. The oxidant may be added to adjust the oxidation reduction potential (ORP) of the nickel enriched solution to a manganese oxidation ORP. Mixing the base may adjust the pH of the nickel enriched solution to a manganese oxidation pH. As one example, the manganese oxidation pH may be in a range of 2 to 6, such as from 2.5 to 5.5. The base may be a strong base such as sodium hydroxide, nickel hydroxide, or other NMC hydroxides or the like. The temperature of the nickel enriched solution during mixing may be above room temperature.

At 714, method 700 includes separating the aqueous pre-extraction solution and manganese oxide precipitate (e.g., 612 of FIG. 6). The manganese oxide precipitate may include nickel hydroxide and cobalt hydroxide in addition to manganese oxide. The manganese oxide precipitate separated from the aqueous pre-extraction solution may be re-leached to recover the nickel as discussed above with respect to FIGS. 3-4. Method 700 ends.

Figure 9:
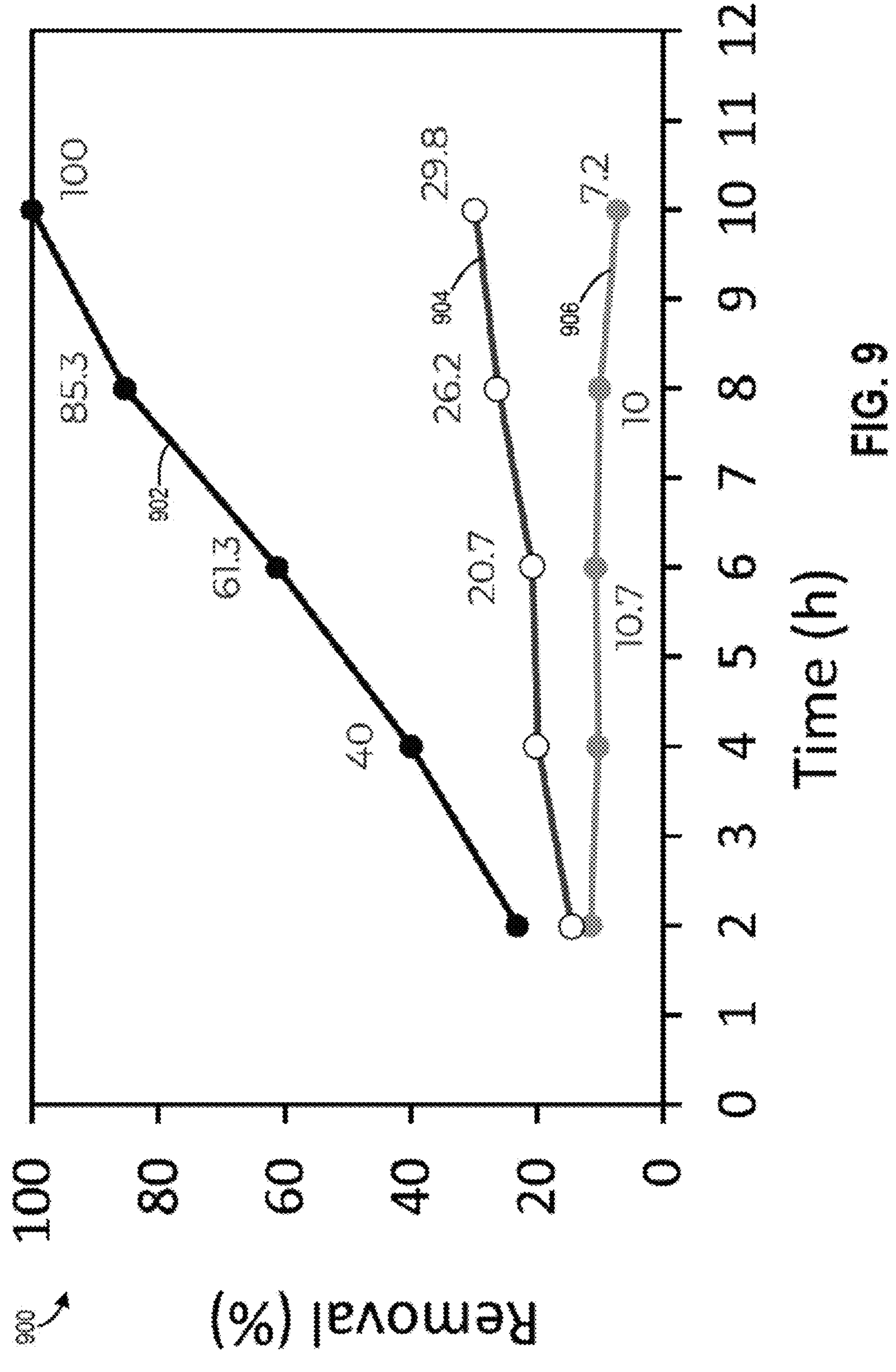
FIG. 9 shows a graph of percent removal of manganese ions over time at different pH levels during manganese oxidation as part of precipitating the manganese salts according to the method for preparing an aqueous nickel salt solution including a single liquid/liquid extraction.

FIG. 9 shows a graph 900 of percent removal of metal ions as a function of manganese oxidation duration (e.g., during mixing at step 712 of method 700). A first plot 902 corresponds to manganese ions, a second plot 904 corresponds to cobalt ions, and a third plot 906 corresponds to nickel ions. As shown in graph 900, a manganese oxidation duration of 10 hours results in substantially 100% removal of manganese salts from the aqueous pre-extraction solution. As a function of time, removal of both manganese and cobalt ions increases while the percent removal of nickel stays substantially unchanged. In this way, the conditions of manganese oxidation as described above with respect to method 700 unexpectedly result in preferential precipitation of manganese and cobalt salts over precipitation of nickel salts.

Figure 10:
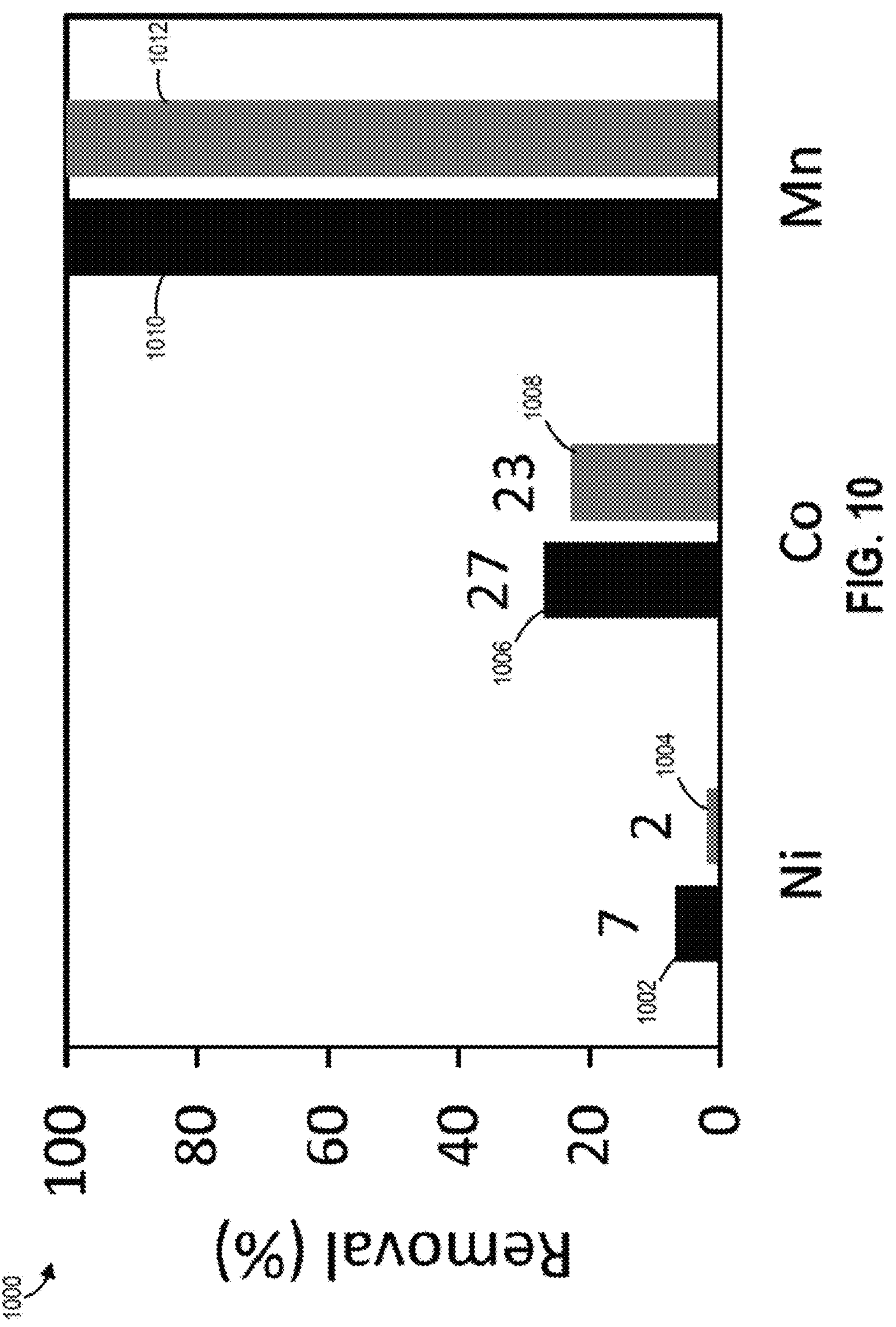
FIG. 10. shows a chart comparing percent removal of nickel ions, cobalt ions, and manganese ions during manganese oxidation as part of precipitating the manganese salts according to the method for preparing an aqueous nickel salt solution including a single liquid/liquid extraction.

FIG. 10 shows chart 1000 depicting percent removal of metal ions from the aqueous pre-extraction solution measured by ICP-OES of both the liquid phases (e.g., nickel enriched solution and aqueous pre-extraction solution) and the solid phase (e.g., manganese oxide precipitate). Bar 1002 corresponds to nickel ions measured in the solid phase, and bar 1004 corresponds to nickel ions measured in the liquid phase. Bar 1006 corresponds to cobalt ions measured in the solid phase, and bar 1008 corresponds to cobalt ions in the liquid phase. Bar 1010 corresponds to manganese ions in the solid phase, and bar 1012 corresponds to manganese ions in the liquid phase.

As shown in chart 1000, manganese oxidation of the nickel enriched solution results in substantially 100% removal of manganese ions, both as measured in the solid phase and the liquid phase. The concentration of manganese salts in the aqueous pre-extraction solution may be less than or equal to 50 ppm such as less than 30 ppm, including less than or equal to 1 ppm. It is an unexpected benefit of this process that some cobalt ions are also removed as a result of manganese oxidation. Further, the percent removal of nickel from the liquid phase is limited to 2%. The removed nickel may be further recovered by re-leaching as discussed above.

Figure 11:
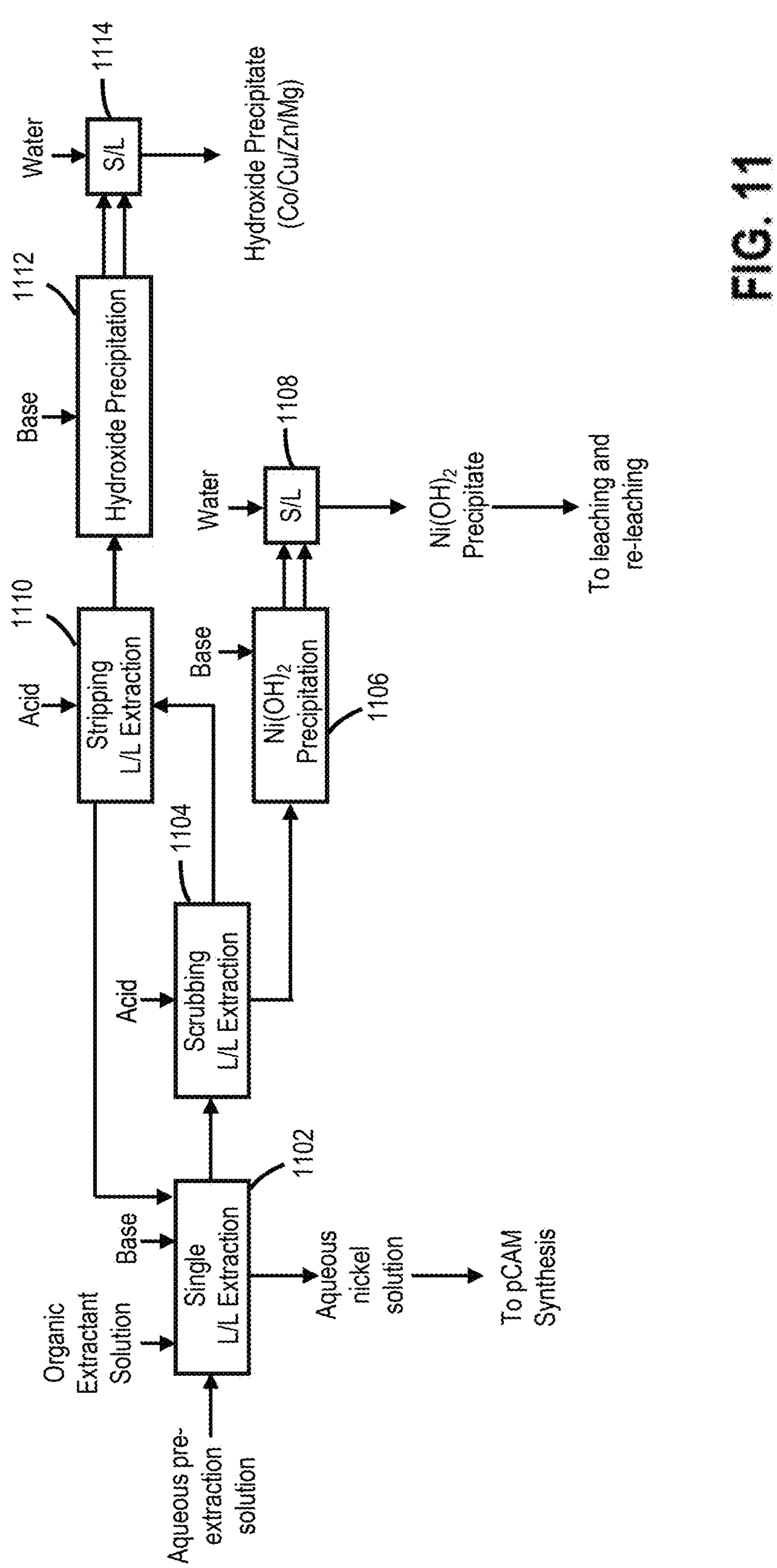
FIG. 11 shows a process flow diagram of extracting the second impurity salts and cobalt salts step according to the method for preparing an aqueous nickel salt solution including a single liquid/liquid extraction.

FIG. 11 shows a process flow diagram 1100 of an example of a process for the solvent extraction of cobalt salts and of the second group of impurity salts. The aqueous pre-extraction solution formed as a result of the first group of impurity salts and the manganese salt precipitation is used as the input for extracting the second group of impurity salts and the cobalt salt. By using the precipitation of the first group of impurity salts and the manganese salts to form the pre-extraction solution, it is in a condition to form an aqueous nickel solution with a single liquid/liquid extraction. The precipitation steps provide a time and cost savings over performing multiple liquid/liquid extractions to form an aqueous nickel salt solution which may demand even further purification steps before being used in a pCAM synthesis.

At 1102, the aqueous pre-extraction solution undergoes a one-step liquid/liquid (L/L) solvent extraction. Reagents for the L/L extraction include an organic extractant and a base. The organic extractant may be dissolved in an organic diluent. In some examples the organic extractant may be at least partially saponified (i.e., converted to a salt of an acid) by addition of the base. The single L/L extraction produces an aqueous raffinate and a loaded organic phase. Aqueous raffinate herein refers to an aqueous phase formed after mixing a pre-extraction aqueous phase and an organic extractant phase. A loaded organic phase herein refers to an organic phase including an organic extractant, an organic diluent, and metal ions pulled from the aqueous pre-extraction phase as a result of the mixing. The aqueous raffinate may be an aqueous nickel salt solution. The aqueous nickel salt solution may be of sufficient purity to used directly (i.e., without additional purification steps) in a pCAM synthesis process. For example, the aqueous nickel solution may not demand further extraction or other purification steps such as crystallization to reach the battery-grade purity demanded for a pCAM synthesis.

The loaded organic phase may optionally be directed to a scrubbing L/L extraction at 1104 using an acidic aqueous solution. The scrubbing L/L extraction forms a scrubbed aqueous raffinate and a scrubbed loaded organic phase. The scrubbed aqueous raffinate includes nickel ions remaining from the single L/L extraction.

The scrubbed aqueous raffinate, if formed, may then be directed to nickel hydroxide precipitation at 1106. Reagents for nickel hydroxide precipitation include a base and/or basic solution. Nickel hydroxide precipitation forms a nickel hydroxide precipitate and a waste solution. At 1108, water may be added, and solid/liquid separation may be used to separate the nickel hydroxide precipitate and the waste solution. The nickel hydroxide precipitate may be directed to leaching and re-leaching as discussed above.

The scrubbed loaded organic phase, if formed, may then be directed to a stripping L/L extraction at 1110 and stripped with an acidic aqueous solution. The stripping L/L extraction forms a stripped aqueous raffinate and a stripped loaded organic phase. The stripped loaded organic phase may include organic diluent and organic extractant. The stripped loaded organic phase may be substantially free from metal ions and may be recycled back into the single L/L extraction 1102.

The stripped aqueous raffinate, if formed, is optionally directed to hydroxide precipitation 1112. Reagents for hydroxide precipitation include a base. The hydroxide precipitation may include precipitation of metal ions remaining in the stripped aqueous raffinate. The metal ions may include one or more of cobalt ions, manganese ions, zinc ions, calcium ions, and magnesium ions. Hydroxide precipitation 1112 forms a second waste solution and hydroxide precipitate that may be substantially nickel free. At 1114 water may be added, and the hydroxide precipitate and second waste solution are subject to solid liquid separation. Since the hydroxide precipitate may not include substantial quantities of nickel ions, this precipitate may be directed to waste or other processing streams and may not need to be directed to leaching and re-leaching.

Figure 12:
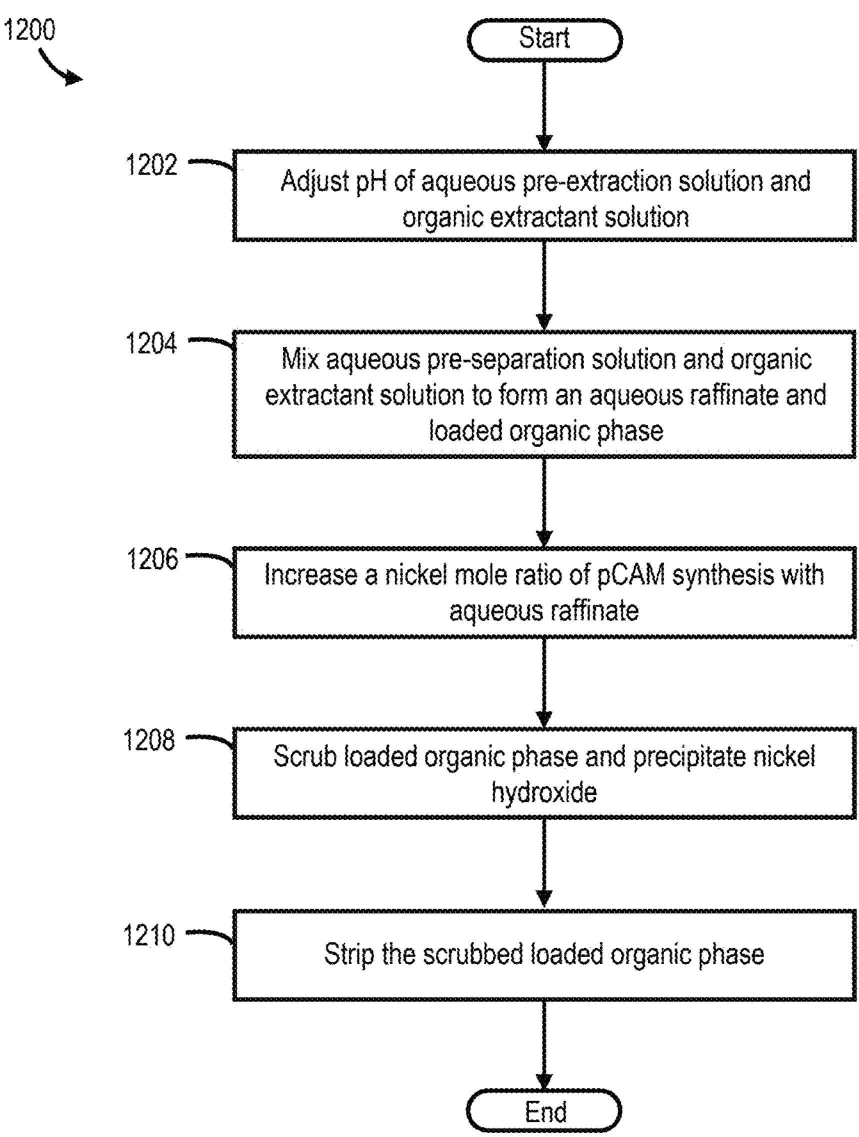
FIG. 12 shows a flowchart of an example of a method for extracting the second impurity salt and cobalt salts as part of the method for preparing an aqueous nickel salt solution including a single liquid/liquid extraction.

FIG. 12 shows a flowchart of an example of a method 1200 for extracting second impurities. Extracting second impurities may be the step 106 of FIG. 2 and may follow the process flow diagram of FIG. 11.

At 1202, method 1200 includes adjusting the pH of an aqueous pre-extraction solution and/or of an organic extractant solution. The aqueous pre-extraction solution may be the solution formed after precipitation of the first impurities as discussed above with respect to method 700. Adjusting the pH of the aqueous pre-extraction solution may include mixing a water-soluble acid or base and the aqueous pre-extraction solution to bring the pH to an aqueous extraction pH. As one example, the aqueous extraction pH may be less than 7. In further examples, the aqueous extraction pH may be in a range of from 4 to 6, such as from 5 to 5.9. In some examples, the aqueous extraction pH may be between 5 and 5.7

Adjusting the pH of the organic extractant solution may include adding a base to saponify an organic extractant. The organic extractant comprises an organic acid, such as a dialkylphosphinic acid having the formula R1R2PO2H where the R1 and R2 are alkyl groups. In some examples, the dialkylphosphinic acid extractant may be bis(2,4,4 trimethylpentyl)phosphinic acid. The organic extractant solution may include an organic diluent. The concentration of the organic extractant in the organic diluent may be about 10% to about 30% by weight, such as from about 15% to about 22% by weight, including from about 18% to about 20% by weight. As one example, the organic diluent may be a paraffinic diluent. As one example, the organic extractant may be Cyanex® 272.

Saponifying the organic extractant is the process of converting the organic acid to an acid salt by adding a water-soluble base, such as sodium hydroxide to the organic extractant or to the aqueous pre-extraction solution. A saponification percent may be equivalent to a molar percent of saponifier (e.g., OH—) added with respect to moles of organic extractant. As one example, adjusting the pH may include adding base to reach a saponification percent in a range of from 20% to 35%.

At 1204, method 1200 includes mixing the aqueous pre-extraction solution and the organic extractant solution to form an aqueous raffinate and a loaded organic phase (e.g., 1102 of FIG. 11). Mixing may include agitating to cause formation of small droplets of aqueous pre-extraction solution and organic extractant to increase surface area contact between the two. As discussed above, the organic extractant solution may be prepared as a solution of an organic extractant in an organic diluent. A ratio of organic phase (e.g., organic extractant and diluent) to aqueous phase (e.g., aqueous pre-extraction solution) may be from 0.5:1 to 3:1, such as 2:1 or 1:1. Mixing may include mixing at an extraction temperature. For example, the extraction temperature may be above room temperature. As one example, the extraction temperature may be in a range of from 40° to 60° C. In further examples, the extraction temperature may be 50° C.

As noted above (e.g., 108 of FIG. 1), the aqueous raffinate, which is an aqueous solution of a nickel salt, may be of sufficient purity to be used directly in the synthesis of a cathode active material precursor. For example, at 1206, method 1200 includes increasing a nickel to cathode metal mole ratio in a pCAM synthesis with the aqueous raffinate. The pCAM synthesis may include preparing an aqueous mixture of metal salts including nickel salts, manganese salts, and cobalt salts. Molar ratios of the metal salts may be adjusted by adding a solution of an additional amount of salt of a single metal ion. At 1206, the aqueous raffinate including the aqueous nickel salt may be added to adjust the moles of nickel relative to the moles of manganese and/or the moles of cobalt. Adding the aqueous raffinate may include using the aqueous solution of nickel salts by adding the aqueous raffinate directly to the pCAM synthesis without further purification steps such as precipitation, extraction, or crystallization. When the desired molar ratios of the metal salts are present in the aqueous mixture, a pH of the aqueous mixture may be increased by addition of a base, such as an hydroxide base, to precipitate the pCAM material as a mixed metal hydroxide.

Alternatively, or in addition, the aqueous raffinate may be of sufficient purity to be combined with sufficiently pure sources of cobalt and manganese salts. For example, an amount of a pure manganese salt, such as a pure solid manganese sulfate or hydroxide or a solution thereof, and an amount of a pure cobalt salt, such as a pure solid cobalt sulfate or hydroxide or a solution thereof, may be combined along with the aqueous solution of a nickel salt to form an aqueous solution having a desired or targeted ratio of nickel, manganese, and cobalt. Increasing the pH of this aqueous mixture would cause precipitation of the pCAM material, as noted above. Other techniques can also be used to synthesize pCAM from the pure aqueous nickel salt solution described herein and would be known to one of ordinary skill in the art, given the benefit of this disclosure. For example, sufficiently pure cobalt salts may result from the loaded organic phase of the single liquid/liquid extraction (e.g., 1102 of method 1100 and 1204 of method 1200).

At 1208, method 1200 optionally includes scrubbing the loaded organic phase and precipitating nickel hydroxide (e.g., 1104 of FIG. 11). Scrubbing (re-extracting) the loaded organic phase may include mixing the loaded organic phase with an acidic aqueous solution to form a scrubbed loaded organic phase and a scrubbed aqueous raffinate. For example, the ratio of organic phase to aqueous phase may be from 1:1 to 40:1, such as 5:1 to 10:1 and 6:1 to 8:1. The scrubbed aqueous raffinate may include nickel salts not partitioned into the aqueous raffinate at step 1204. Precipitating nickel hydroxide includes precipitating nickel hydroxide from the scrubbed aqueous raffinate. Precipitating may include mixing the scrubbed aqueous raffinate with an hydroxide base to form the nickel hydroxide precipitate. The nickel hydroxide precipitate may be mixed with a leaching solution to recover the nickel as discussed above with respect to FIGS. 3-4. Also, the nickel hydroxide precipitate may be used to form an aqueous nickel hydroxide solution, which, as discussed above, may be used as a base to adjust or maintain the pH during the disclosed process. In that way, the concentration of additional ion salts, specifically sodium salts, may be minimized.

At 1210, method 1200 optionally includes stripping the scrubbed loaded organic phase (e.g., 1110 of FIG. 11). Stripping the scrubbed loaded organic phase may include mixing the scrubbed loaded organic phase with an acidic aqueous solution to form a stripped organic phase and a stripped aqueous raffinate. For example, the ratio of organic phase to aqueous phase may be from 1:1 to 40:1, such as from 1:1 to 3:1, such as 2:1. The stripped organic phase may include the organic extractant and organic diluent. The resulting stripped organic phase may be substantially free of transition metal ions. The stripped organic phase may be added to the organic extractant at step 1204 to reuse the organic extractant and organic diluent. The stripped aqueous raffinate may include transition metal ions but may be substantially free of nickel ions. Method 1200 ends.

In this way, a one-step liquid/liquid (L/L) solvent extraction method may be used to remove a cobalt salt and a second group of impurity salts from the aqueous pre-extraction solution, to form the aqueous nickel salt solution of sufficient purity for use in forming cathode active material precursors. In addition, however, the aqueous pre-extraction solution may also include a calcium salt resulting from the leaching of the mixed metal salt source (e.g. 102 of FIG. 1 and 302 of FIG. 3) that is difficult to remove by a single solvent extraction. It has been found that the calcium salt may be effectively removed by ion exchange to form an aqueous nickel salt solution of battery grade purity.

Figure 13:
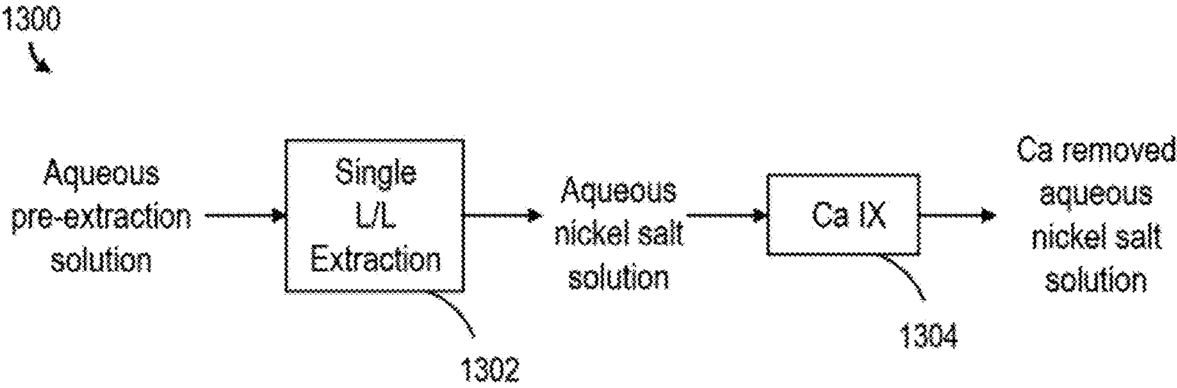
FIG. 13 and FIG. 14 show process flow diagrams for removing calcium salts from the aqueous pre-extraction solution according to the method for preparing an aqueous nickel salt solution including a single liquid/liquid extraction.
Figure 14:
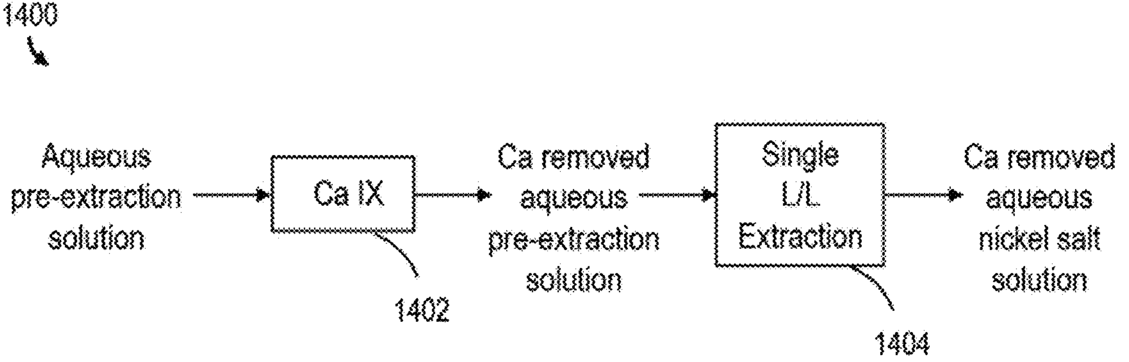

Thus, optionally, the method to remove a cobalt salt and a second group of impurity salts may further include removal of a calcium salt by ion exchange prior to or following the liquid/liquid solvent extraction, as shown in FIG. 13 and FIG. 14. For example, removal of a calcium salt by ion exchange may follow, such as directly follow, precipitating a first group of impurity salts and manganese oxide to form an aqueous pre-extraction solution (e.g., 104 in FIG. 1 and in FIG. 2) and may precede, such as directly precede, extracting the second group of impurity salts and cobalt salts (e.g., 106 in FIG. 1 and in FIG. 2). Alternatively, or in addition, removal of a calcium salt by ion exchange may follow, such as directly follow, extracting the second group of impurity salts and cobalt salts (e.g., 106 in FIG. 1 and FIG. 2).

For example, FIG. 13 shows a process flow diagram 1300 for removing calcium salts by ion exchange. At 1302, an aqueous pre-extraction solution, such as a solution resulting from the precipitation of a first group of impurity salts and manganese oxide, may be used as an input for a solvent extraction process as discussed above. The second group of impurity salts and the cobalt salts are extracted from the aqueous pre-extraction solution in a single liquid/liquid extraction, resulting in formation of an aqueous raffinate comprising nickel salts and a loaded organic phase, as shown and discussed in relation to 1102 of FIG. 11. The aqueous raffinate may be an aqueous nickel salt solution.

At 1304, the aqueous nickel salt solution is treated to remove calcium salts by ion exchange, resulting in formation of a calcium removed aqueous nickel salt solution. Ion exchange is a purification technique used to separate charged ions based on their affinity for a particular resin. In the process of FIG. 13, the aqueous nickel salt solution and an ion exchange resin having a chemical and/or physical affinity for calcium ions are combined in a vessel. For example, the vessel may be a column packed with the ion exchange resin, and the aqueous nickel salt solution is passed through the column at a chosen flow rate (sometimes referred to bed volumes or BV, which is the number of time a specified volume of solution is passed through the column). Flow may be from the top of the column down through the resin bed or from the bottom of the column up through the resin bed (reverse flow). In this way, calcium ions in contact with the resin are removed from the aqueous nickel salt solution by the ion exchange resin to form a calcium removed aqueous nickel salt solution, which, in some examples, may be used as the aqueous nickel salt solution to increase a nickel to cathode metal mole ratio in a pCAM synthesis, as discussed above (e.g., 1206 of FIG. 12).

FIG. 14 shows an alternative process flow diagram 1400 for removing calcium salts by ion exchange. At 1402, an aqueous pre-extraction solution, such as a solution resulting from the precipitation of a first group of impurity salts and manganese oxide, may be used as an input as discussed above (e.g., 1302 of FIG. 13). In the process of FIG. 14, the aqueous pre-extraction solution and an ion exchange resin having a chemical and/or physical affinity for calcium ions are combined in a vessel, such as a column packed with the ion exchange resin, and the aqueous pre-extraction solution is passed through the column at a chosen flow rate. Calcium ions in contact with the resin are removed from the aqueous pre-extraction solution by the ion exchange resin to form a calcium removed aqueous pre-extraction solution.

At 1404, the second group of impurity salts and the cobalt salts are extracted from the calcium removed aqueous pre-extraction solution in a single liquid/liquid extraction, resulting in formation of a calcium removed aqueous nickel salt solution as an aqueous raffinate comprising nickel salts and a loaded organic phase, as shown and discussed in relation to 1102 of FIG. 11. The aqueous raffinate, in some examples, may be used to increase a nickel to cathode metal mole ratio in a pCAM synthesis, as discussed above (e.g., 1206 of FIG. 12).

The choice of an ion exchange resin is generally based on an ability to selectively remove target ions without also removing ions of interest. Suitable ion exchange resins for calcium salt removal in the process of FIG. 13 and FIG. 14 include those having functional groups capable of ionically binding at least calcium ions without also binding nickel ions. For example, the ion exchange resin may comprise an organic acid group, such as a dialkylphosphinic acid. In some examples, the ion exchange resin is an organic resin that has been solvent-impregnated with a dialkylphosphinic acid. As a specific example, the ion exchange resin may be a solvent-impregnated resin comprising di-(2-ethylhexyl) phosphonic acid. It has been found that such a resin is capable of removing calcium ions without significantly removing nickel ions. For example, reduction in calcium ions may be greater than 90%, including greater than 95% and greater than 98% while nickel ion retention may be greater than 98%, such as greater than 99%.

The choice between the process of FIG. 13 and FIG. 14 may depend, at least in part, on the distribution and quantity of ions in the aqueous pre-extraction solution as well as on the choice of ion exchange resin. As discussed above, ion exchange resins differ in their ability to remove specific ions from an aqueous solution. For example, a solvent impregnated resin containing di-(2-ethylhexyl)phosphonic acid has a known selectivity order for cation extraction from sulfate containing solutions of:

$$Fe^{+3} > Al^{+3} > Pb^{+2} = Zn^{+2} > Ca^{+2} > Cd^{+2} = Mn^{+2} > Cr^{+3} > Mg^{+2} > Co^{+2}.$$

Thus, it can be challenging to efficiently and effectively remove calcium ions from a solution that also contains, for example, manganese and cobalt salts by ion exchange.

For this reason, the process of FIG. 13 and FIG. 14 preferably occurs after the precipitation of a first group of impurity salts and manganese oxide to form an aqueous pre-extraction solution, shown to remove manganese salts (e.g., 104 in FIG. 1 and in FIG. 2). In addition, for some examples, it may also be preferable to use the process shown in FIG. 13, in which solvent extraction precedes ion exchange since the solvent extraction is shown to remove significant amounts of cobalt salts. This would enable a more effective removal of calcium salts without interference from the presence of cobalt salts.

The binding of calcium salts may be reversible as well as irreversible, depending on the ion exchange resin and on the process conditions. For example, calcium salts may be bound to the calcium ion exchange resin at a target feed pH and later removed from the resin at a regeneration pH. In this way, the ion exchange resin may be eluted and reused. In the process of FIG. 13 and FIG. 14, for example, the feed pH may be acidic, such as between a pH of 1 and 5, including between 2 and 4, and particularly a pH of 3. Regeneration of the ion exchange resin may occur at a pH that is lower than the feed pH.

The technical effect of methods 400, 700, and 1200 is to efficiently produce a battery grade aqueous solution of nickel salts. The battery-grade aqueous nickel salt solution may be used directly in the synthesis of pCAM materials. Further, the method leaches and re-leaches precipitates which include nickel not in the aqueous nickel salt solution to increase an overall yield of nickel salts from the mixed metal inputs. Further, the methods provide a route for more easily filtering metal hydroxide precipitates as part of precipitating impurity salts.

The disclosure also provides support for a method for preparing an aqueous nickel salt solution from an aqueous mixed metal salt solution comprising a cobalt salt, a manganese salt, a nickel salt and one or more impurity salts, the method comprising: precipitating a first group of the one or more impurity salts and the manganese salt from the aqueous mixed metal salt solution to form one or more impurity precipitates, a manganese oxide precipitate, and an aqueous pre-extraction solution, and mixing the aqueous pre-extraction solution and an organic extractant to form an aqueous raffinate phase and a loaded organic phase, wherein the aqueous raffinate phase is the aqueous nickel salt solution and the loaded organic phase comprises the cobalt salt and a second group of the one or more impurity salts. In a first example of the method, the first group of the one or more impurity salts comprises a copper salt, an aluminum salt, and an iron salt. In a second example of the method, optionally including the first example, precipitating the first group of impurity salts and the manganese salt includes one or more of cementation, base hydrolysis, and oxidation. In a third example of the method, optionally including one or both of the first and second examples, precipitating the first group of the one or more impurity salts comprises mixing the aqueous mixed metal salt solution and iron powder or nickel powder to form a copper precipitate and a copper depleted solution, separating the copper precipitate and the copper depleted solution, mixing the copper depleted solution and a base to form one or more metal hydroxide precipitates and a nickel enriched solution, separating the one or more metal hydroxide precipitates and the nickel enriched solution, and mixing an oxidizing gas and the nickel enriched solution to form the manganese oxide precipitate and the aqueous pre-extraction solution. In a fourth example of the method, optionally including one or more of each of the first through third examples, the oxidizing gas comprises a mixture of sulfur dioxide and oxygen. In a fifth example of the method, optionally including one or more of each of the first through fourth examples, the method further comprises: adjusting a pH of the nickel enriched solution to a manganese oxidation pH in a range of from 2 to 6 while mixing the oxidizing gas. In a sixth example of the method, optionally including one or more of each of the first through fifth examples, a concentration of the manganese salt in the aqueous pre-extraction solution is less than or equal to 1 ppm. In a seventh example of the method, optionally including one or more of each of the first through sixth examples, the organic extractant is a dialkylphosphinic acid. In an eighth example of the method, optionally including one or more of each of the first through seventh examples, the dialkylphosphinic acid is bis(2,2,4 trimethylpentyl)phosphinic acid. In a ninth example of the method, optionally including one or more or each of the first through eighth examples, the aqueous pre-extraction solution comprises a calcium salt and the method further comprises removing the calcium salt from the aqueous pre-extraction solution by ion exchange to form the aqueous nickel salt solution. In a tenth example of the method, optionally including one or more or each of the first through ninth examples, the calcium salt is removed by ion exchange following mixing the aqueous pre-extraction solution and the organic extractant. In an eleventh example of the method, optionally including one or more or each of the first through tenth examples, the calcium salt is removed by ion exchange directly following mixing the aqueous pre-extraction solution and the organic extractant. In an twelfth example of the method, optionally including one or more or each of the first through eleventh examples, the calcium salt is removed by ion exchange prior to mixing the aqueous pre-extraction solution and the organic extractant. In a thirteenth example of the method, optionally including one or more or each of the first through twelfth examples, the calcium salt is removed by ion exchange directly following precipitating the first group of the one or more impurity salts and the manganese salt. In a fourteenth example of the method, optionally including one or more of each of the first through thirteenth examples, the second group of the one or more impurity salts comprises a magnesium salt. In a fifteenth example of the method, optionally including one or more of each of the first through fourteenth examples, the aqueous nickel salt solution is used to adjust a nickel to cathode metal molar ratio in a synthesis of a cathode active material precursor. In a sixteenth example of the method, optionally including one or more of each of the first through fifteenth examples, the aqueous mixed metal salt solution is an acidic aqueous leach solution prepared by leaching a mixture of metal salts from a granular mass of crushed lithium-ion battery materials including cathode and anode materials. In a seventeenth example of the method, optionally including one or more of each of the first through sixteenth examples, the granular mass of crushed lithium-ion battery materials is heat treated at a temperature of from 500° C. to 1000° C. and leached with a lithium leach solution to remove lithium materials prior to leaching the mixture of metal salts.

The disclosure also provides support for a method for preparing an aqueous nickel salt solution from an aqueous mixed metal salt solution comprising a cobalt salt, a manganese salt, a nickel salt and one or more impurity salts, the method comprising: mixing a delithiated battery black mass and an acidic aqueous solution to form the aqueous mixed metal salt solution, mixing the aqueous mixed metal salt solution and iron powder to form a copper precipitate and a copper depleted solution, separating the copper precipitate and the copper depleted solution, mixing the copper depleted solution and a base to increase a pH and form one or more metal hydroxide precipitates and a nickel enriched solution, separating the one or more metal hydroxide precipitates and the nickel enriched solution, bubbling an oxidizing gas into the nickel enriched solution to form a manganese oxide precipitate and an aqueous pre-extraction solution, mixing the aqueous pre-extraction solution and an organic extractant solution to form an aqueous raffinate phase and a loaded organic phase, wherein the aqueous raffinate phase is the aqueous nickel salt solution and the loaded organic phase comprises the cobalt salt and a second group of impurity salts, and leaching residual nickel from the one or more metal hydroxide precipitates, from the manganese oxide precipitate, or both.

The disclosure also provides support for a method for synthesizing a cathode active material precursor comprising: preparing an aqueous nickel salt solution from an aqueous mixed metal salt solution comprising a cobalt salt, a manganese salt, a nickel salt and impurity salts by: mixing a delithiated battery black mass and an acidic aqueous solution to form a delithiated battery black mass leachate, mixing the delithiated battery black mass leachate and iron powder to form a copper precipitate and a copper depleted solution, separating the copper precipitate and the copper depleted solution, mixing the copper depleted solution and a base to increase a pH and form one or more metal hydroxide precipitates and a nickel enriched solution, separating the one or more metal hydroxide precipitates and the nickel enriched solution, mixing an oxidizing gas and the nickel enriched solution to form a manganese oxide precipitate and an aqueous pre-extraction solution, and mixing the aqueous pre-extraction solution and an organic extractant solution to form an aqueous raffinate phase and a loaded organic phase, wherein the aqueous raffinate phase is the aqueous nickel salt solution and the loaded organic phase comprises the cobalt salt and a second group of impurity salts, and adjusting a nickel to cathode metal molar ratio in a synthesis of the cathode active material precursor by adding the aqueous nickel salt solution.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for preparing an aqueous nickel salt solution from an aqueous mixed metal salt solution comprising a cobalt salt, a manganese salt, a nickel salt and one or more impurity salts, the method comprising:

precipitating a first group of the one or more impurity salts and the manganese salt from the aqueous mixed metal salt solution to form one or more impurity precipitates, a manganese oxide precipitate, and an aqueous pre-extraction solution; and mixing the aqueous pre-extraction solution and an organic extractant to form an aqueous raffinate phase and a loaded organic phase, wherein the aqueous raffinate phase is the aqueous nickel salt solution and the loaded organic phase comprises the cobalt salt and a second group of the one or more impurity salts.

2. The method of claim 1, wherein the first group of the one or more impurity salts comprises a copper salt, an aluminum salt, and an iron salt.

3. The method of claim 1, wherein precipitating the first group of impurity salts and the manganese salt includes one or more of cementation, base hydrolysis, and oxidation.

4. The method of claim 1, wherein precipitating the first group of the one or more impurity salts comprises:

mixing the aqueous mixed metal salt solution and iron powder or nickel powder to form a copper precipitate and a copper depleted solution, separating the copper precipitate and the copper depleted solution;

mixing the copper depleted solution and a base to form one or more metal hydroxide precipitates and a nickel enriched solution;

separating the one or more metal hydroxide precipitates and the nickel enriched solution; and mixing an oxidizing gas and the nickel enriched solution to form the manganese oxide precipitate and the aqueous pre-extraction solution.

5. The method of claim 4, wherein the oxidizing gas comprises a mixture of sulfur dioxide and oxygen.

6. The method of claim 4, further comprising adjusting a pH of the nickel enriched solution to a manganese oxidation pH in a range of from 2 to 6 while mixing the oxidizing gas.

7. The method of claim 1, wherein a concentration of the manganese salt in the aqueous pre-extraction solution is less than or equal to 1 ppm.

8. The method of claim 1, wherein the organic extractant is a dialkylphosphinic acid.

9. The method of claim 8, wherein the dialkylphosphinic acid is bis(2,4,4 trimethylpentyl)phosphinic acid.

10. The method of claim 1, wherein the aqueous pre-extraction solution comprises a calcium salt and wherein the method further comprises removing the calcium salt from the aqueous pre-extraction solution by ion exchange to form the aqueous nickel salt solution.

11. The method of claim 10, wherein the calcium salt is removed by ion exchange following mixing the aqueous pre-extraction solution and the organic extractant.

12. The method of claim 11, wherein the calcium salt is removed by ion exchange directly following mixing the aqueous pre-extraction solution and the organic extractant.

13. The method of claim 11, wherein the calcium salt is removed by ion exchange directly following precipitating the first group of the one or more impurity salts and the manganese salt.

14. The method of claim 10, wherein the calcium salt is removed by ion exchange prior to mixing the aqueous pre-extraction solution and the organic extractant.

15. The method of claim 1, wherein the second group of the one or more impurity salts comprises a magnesium salt.

16. The method of claim 1, wherein the aqueous nickel salt solution is used to adjust a nickel to cathode metal molar ratio in a synthesis of a cathode active material precursor.

17. The method of claim 1, wherein the aqueous mixed metal salt solution is an acidic aqueous leach solution prepared by leaching a mixture of metal salts from a granular mass of crushed lithium-ion battery materials including cathode and anode materials.

18. The method of claim 17, wherein the granular mass of crushed lithium-ion battery materials is heat treated at a temperature of from 500° C. to 1000° C. and leached with a lithium leach solution to remove lithium materials prior to leaching the mixture of metal salts.

19. A method for preparing an aqueous nickel salt solution from an aqueous mixed metal salt solution comprising a cobalt salt, a manganese salt, a nickel salt and one or more impurity salts, the method comprising:

mixing a delithiated battery black mass and an acidic aqueous solution to form the aqueous mixed metal salt solution;

mixing the aqueous mixed metal salt solution and iron powder to form a copper precipitate and a copper depleted solution;

separating the copper precipitate and the copper depleted solution;

mixing the copper depleted solution and a base to increase a pH and form one or more metal hydroxide precipitates and a nickel enriched solution;

separating the one or more metal hydroxide precipitates and the nickel enriched solution;

bubbling an oxidizing gas into the nickel enriched solution to form a manganese oxide precipitate and an aqueous pre-extraction solution;

mixing the aqueous pre-extraction solution and an organic extractant solution to form an aqueous raffinate phase and a loaded organic phase, wherein the aqueous raffinate phase is the aqueous nickel salt solution and the loaded organic phase comprises the cobalt salt and a second group of impurity salts; and leaching residual nickel from the one or more metal hydroxide precipitates, from the manganese oxide precipitate, or both.

20. A method for synthesizing a cathode active material precursor, comprising:

preparing an aqueous nickel salt solution from an aqueous mixed metal salt solution comprising a cobalt salt, a manganese salt, a nickel salt and impurity salts by:

mixing a delithiated battery black mass and an acidic aqueous solution to form a delithiated battery black mass leachate;

mixing the delithiated battery black mass leachate and iron powder to form a copper precipitate and a copper depleted solution;

separating the copper precipitate and the copper depleted solution;

mixing the copper depleted solution and a base to increase a pH and form one or more metal hydroxide precipitates and a nickel enriched solution;

separating the one or more metal hydroxide precipitates and the nickel enriched solution;

mixing an oxidizing gas and the nickel enriched solution to form a manganese oxide precipitate and an aqueous pre-extraction solution; and mixing the aqueous pre-extraction solution and an organic extractant solution to form an aqueous raffinate phase and a loaded organic phase, wherein the aqueous raffinate phase is the aqueous nickel salt solution and the loaded organic phase comprises the cobalt salt and a second group of impurity salts; and adjusting a nickel to cathode metal molar ratio in a synthesis of the cathode active material precursor by adding the aqueous nickel salt solution.

* * * * *